United States Patent
Yuchi et al.

(10) Patent No.: US 10,618,458 B2
(45) Date of Patent: Apr. 14, 2020

(54) VEHICLE HEADLIGHT CONTROL DEVICE

(71) Applicant: Mazda Motor Corporation, Aki-gun, Hiroshima (JP)

(72) Inventors: Kota Yuchi, Aki-gun (JP); Yasutaka Otsubo, Aki-gun (JP); Takehiko Nishida, Hiroshima (JP); Masahiro Asahi, Hiroshima (JP); Yoshiaki Nakaya, Hiroshima (JP); Manabu Yamaoka, Hiroshima (JP); Takanori Okahashi, Higashihiroshima (JP); Yoshiaki Matsuba, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/344,114

(22) PCT Filed: Oct. 19, 2017

(86) PCT No.: PCT/JP2017/037856
§ 371 (c)(1),
(2) Date: Apr. 23, 2019

(87) PCT Pub. No.: WO2018/079408
PCT Pub. Date: May 3, 2018

(65) Prior Publication Data
US 2020/0062168 A1    Feb. 27, 2020

(30) Foreign Application Priority Data

Oct. 24, 2016    (JP) .................................. 2016-207578

(51) Int. Cl.
*B60Q 1/14*    (2006.01)
*B60Q 1/08*    (2006.01)

(52) U.S. Cl.
CPC .......... *B60Q 1/085* (2013.01); *B60Q 2300/45* (2013.01)

(58) Field of Classification Search
CPC .... B60Q 1/085; B60Q 1/1415; B60Q 1/1423; B60Q 1/143; B60Q 2300/45;
(Continued)

(56) References Cited

U.S. PATENT DOCUMENTS 6,417,624 B1 * 7/2002 Ito ...................... B60Q 1/1415
  307/10.8
6,969,183 B2 * 11/2005 Okubo .................. B60Q 1/085
  362/466

(Continued)

FOREIGN PATENT DOCUMENTS

DE   102009051485 A1   6/2010
EP       2233356 A1   9/2010
(Continued)

OTHER PUBLICATIONS

European Patent Office, Extended European Search Report Issued in Application No. 1786492.3, dated Sep. 19, 2019, Germany, 7 pages.

*Primary Examiner* — Haissa Philogene
(74) *Attorney, Agent, or Firm* — Alleman Hall Creasman & Tuttle LLP

(57) ABSTRACT

A vehicle headlight control device is provided with: a pedestrian detection unit which detects a pedestrian; and a headlight control unit which controls an irradiation state of a headlight. When the pedestrian detection unit detects a pedestrian within an irradiation range of the headlight, the headlight control unit executes dimming control for controlling the irradiation state of the headlight so that a periphery of the pedestrian is dimmed. The pedestrian is irradiated with a part of a high beam or a low beam, or marking light emitted from a dedicated light source. A dimming region is (Continued)

formed around the pedestrian by the dimming control, and contrast in brightness between the pedestrian and his/her surroundings can be raised.

9 Claims, 23 Drawing Sheets

(58) Field of Classification Search
CPC .. B60Q 2300/054; H05B 45/10; H05B 45/12; H05B 45/14
See application file for complete search history.

(56) References Cited

U.S. PATENT DOCUMENTS

| | | | |
|---|---|---|---|
| 10,328,948 B2* | 6/2019 | Asakura | B60W 10/06 |
| 10,369,922 B2* | 8/2019 | Nakashima | B60Q 1/143 |
| 2008/0225271 A1* | 9/2008 | Ohmura | B60Q 1/085 |
| | | | 356/51 |
| 2012/0229028 A1 | 9/2012 | Ackermann et al. | |
| 2016/0114720 A1 | 4/2016 | Schlaug et al. | |
| 2016/0368413 A1 | 12/2016 | Nishii et al. | |
| 2019/0126812 A1* | 5/2019 | Harada | G06K 9/00791 |

FOREIGN PATENT DOCUMENTS

| | | |
|---|---|---|
| EP | 2420986 A1 | 2/2012 |
| JP | 2008120162 A | 5/2008 |
| JP | 2009149152 A | 7/2009 |
| JP | 2014061747 A | 4/2014 |
| JP | 2015033939 A | 2/2015 |
| JP | 2015143065 A | 8/2015 |
| JP | 2016166009 A | 9/2016 |

\* cited by examiner

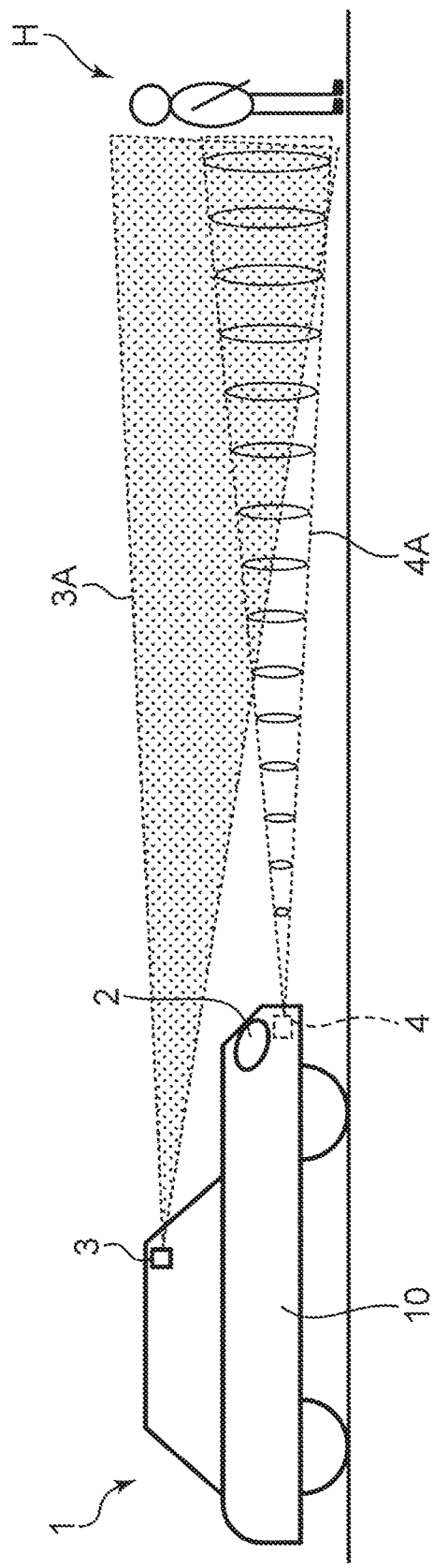

| LED ELEMENT | IRRADIATION RANGE (ANGLE) | |
|---|---|---|
| 1 | −10 | 2 |
| 2 | 0 | 12 |
| 3 | 10 | 22 |
| 4 | 20 | 32 |
| 5 | 30 | 42 |
| 6 | 40 | 52 |
| 7 | 50 | 62 |
| 8 | 60 | 72 |
| 9 | 70 | 82 |
| 10 | 80 | 92 |
| 11 | 90 | 102 |

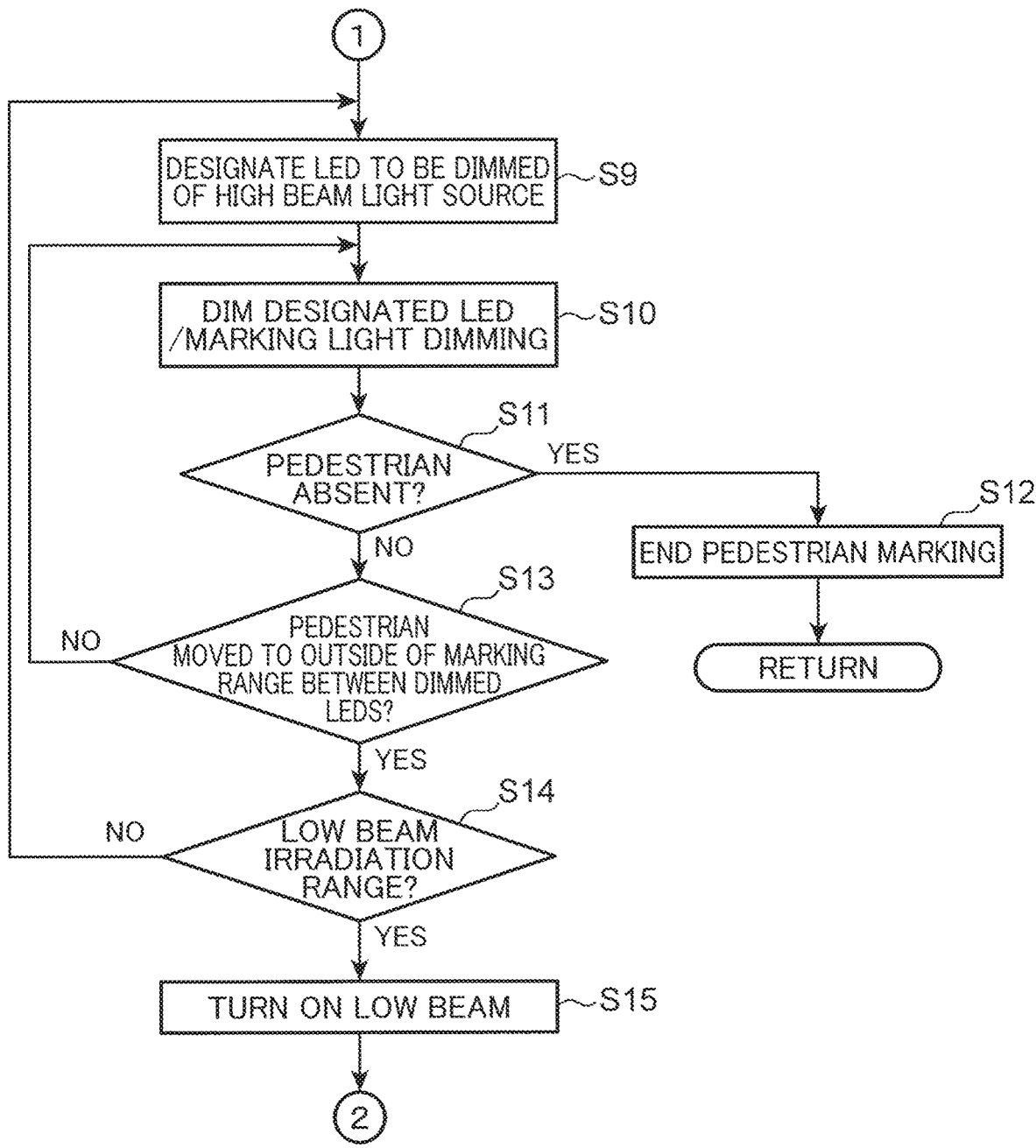

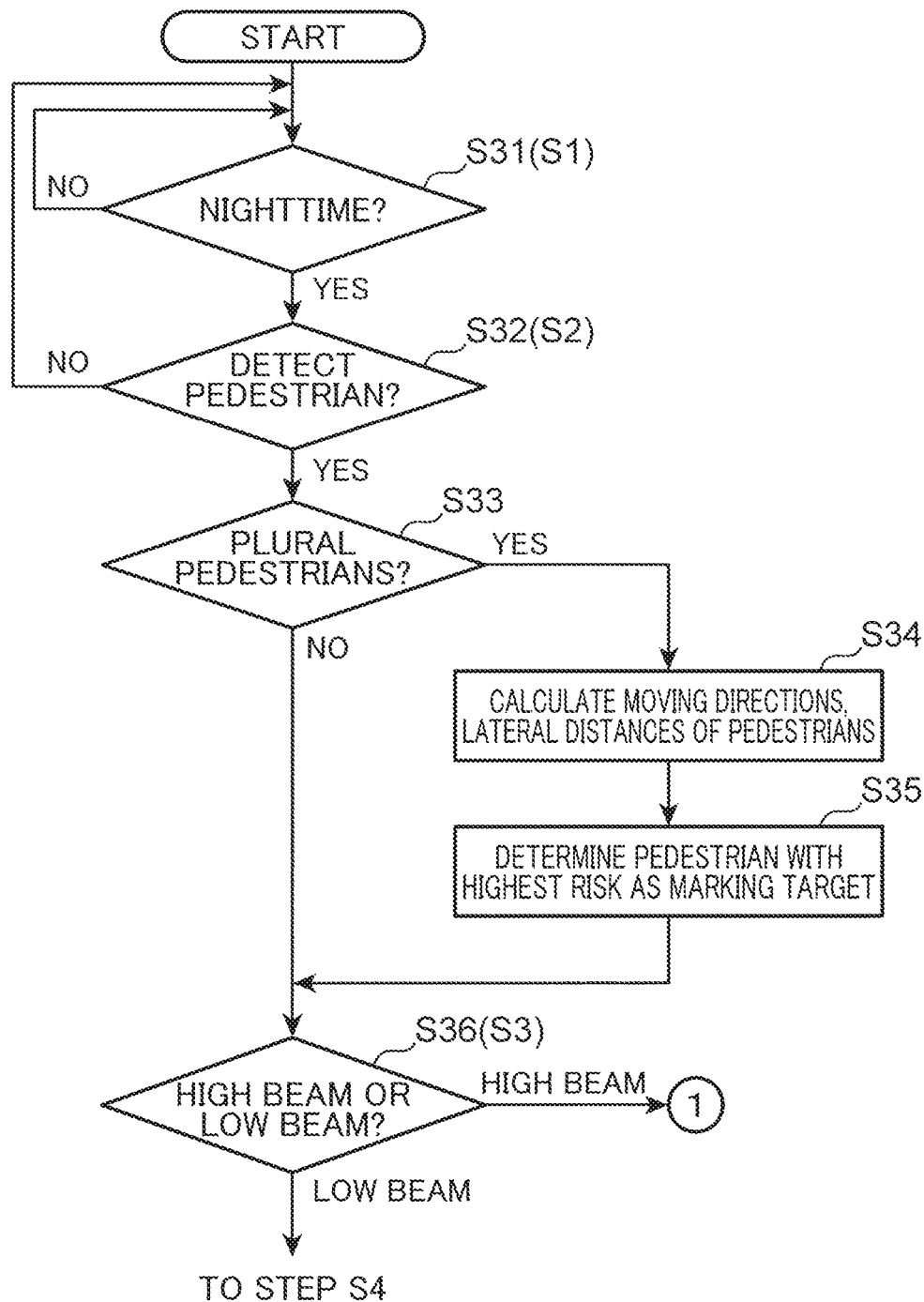

FIG. 17A
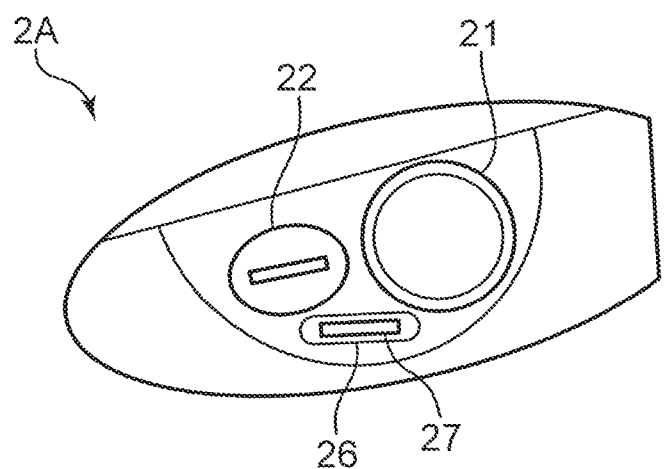
FIG. 17B
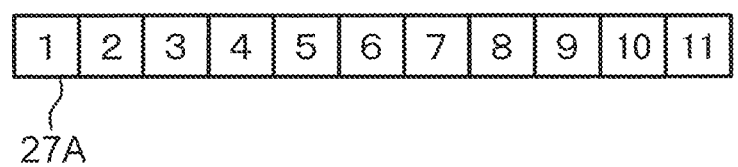

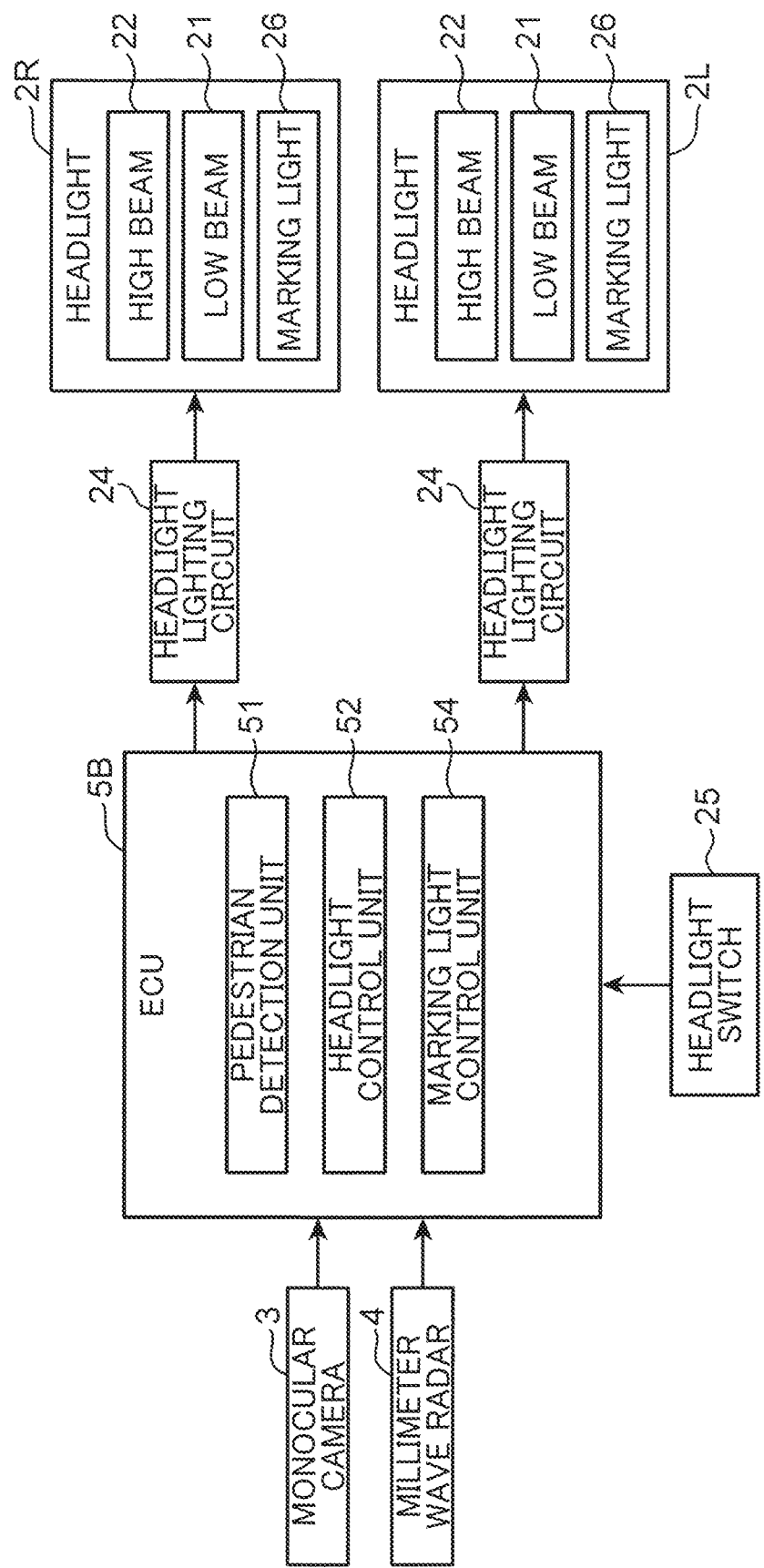

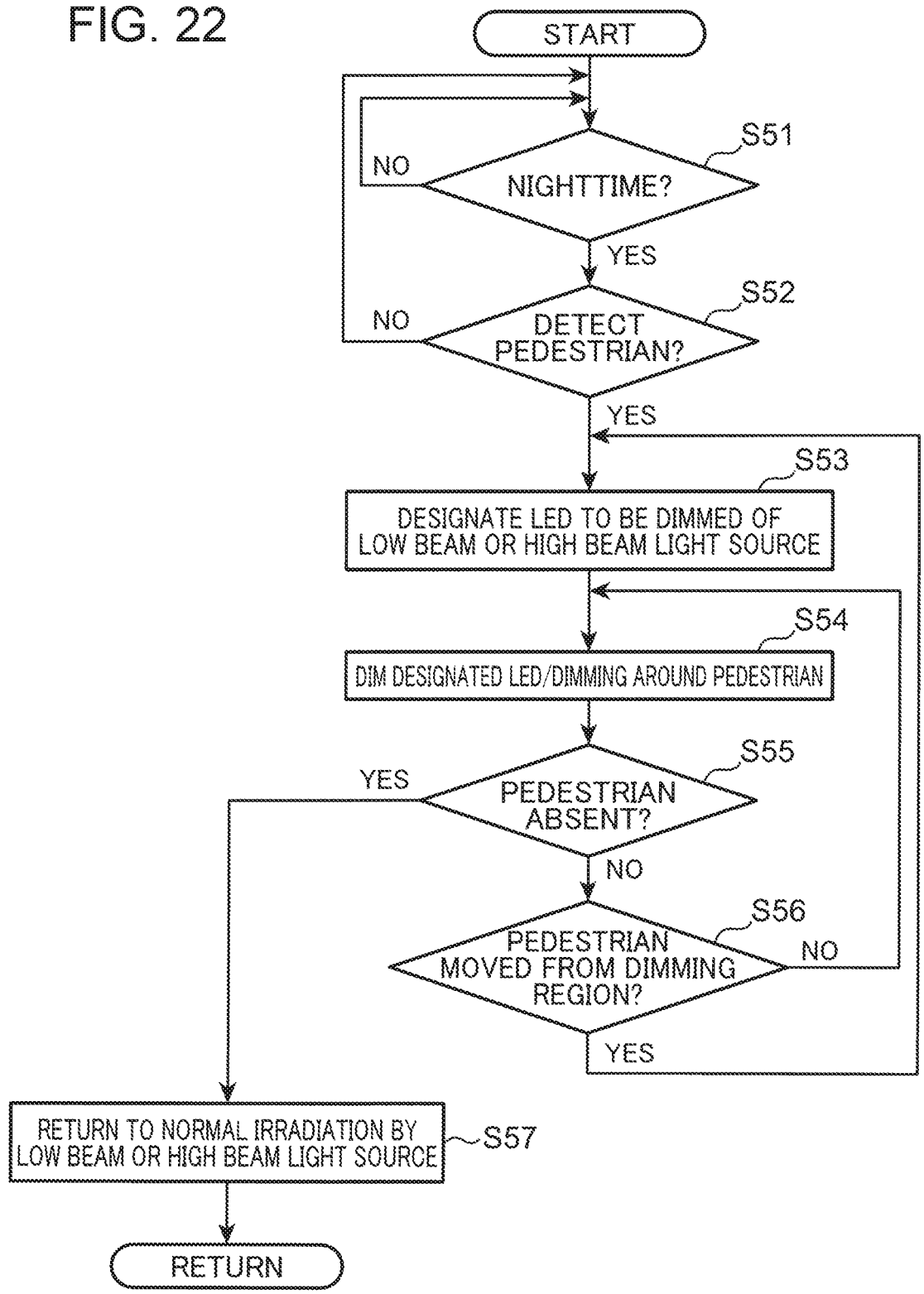

VEHICLE HEADLIGHT CONTROL DEVICE

TECHNICAL FIELD

The present invention relates to a vehicle headlight control device capable of generating irradiation light that makes a pedestrian in front of a vehicle stand out during nighttime traveling.

BACKGROUND ART

In order to improve recognition of a pedestrian by a driver during nighttime traveling of a vehicle, a system for performing pedestrian marking has been proposed. The pedestrian marking system includes a sensing element (for example, an in-vehicle camera or a radar device) for detecting presence of a pedestrian in front of the vehicle and a light source for irradiating the pedestrian with marking light which is a spotlight-like light beam. Patent Literature 1 discloses a configuration in which a light source dedicated to marking light is incorporated in a headlight unit of a vehicle.

However, when luminance around a pedestrian is high, such as when the pedestrian is detected in a region already irradiated with the headlight, there is a problem that it becomes difficult to form irradiation light that makes the pedestrian stand out. For example, when a pedestrian is present in a region already irradiated with a high beam, even if the pedestrian is irradiated with marking light by the light source dedicated to the marking light as in Patent Literature 1, the pedestrian cannot be made much more noticeable. Further, in a case of a system that performs pedestrian marking using a high beam light source instead of the dedicated light source, it is not possible to perform irradiation of marking light that makes a pedestrian existing in a high beam irradiation region stand out.

CITATION LIST

Patent Literature

Patent Literature 1: JP 2015-33939 A

SUMMARY OF INVENTION

An object of the present invention is to provide a vehicle headlight control device capable of generating irradiation light that makes a pedestrian stand out even when the pedestrian exists in an irradiation region of a headlight.

A vehicle headlight control device according to one aspect of the present invention includes a pedestrian detection unit that detects a pedestrian in front of a vehicle and a headlight control unit that controls an irradiation state of the headlight. When the pedestrian detection unit detects a pedestrian within an irradiation range of the headlight, the headlight control unit executes dimming control for controlling the irradiation state of the headlight so that a periphery of the pedestrian is dimmed.

BRIEF DESCRIPTION OF DRAWINGS

FIG. 1 is a schematic view showing a vehicle and a mode of detecting a pedestrian in front of the vehicle.

FIGS. 10A and 10B are flowcharts showing pedestrian marking operation according to the first embodiment.

FIG. 16 is a flowchart showing pedestrian marking operation according to the fourth embodiment.

FIG. 17A is a schematic view showing a headlight unit used in a fifth embodiment, and FIG. 17B is a schematic view of an LED array.

FIG. 18 is a block diagram showing a control configuration of the headlight unit according to the fifth embodiment.

FIG. 22 is a flowchart showing pedestrian marking operation according to the sixth embodiment.

DESCRIPTION OF EMBODIMENTS

[Schematic Configuration of Vehicle]

Figure 2A:
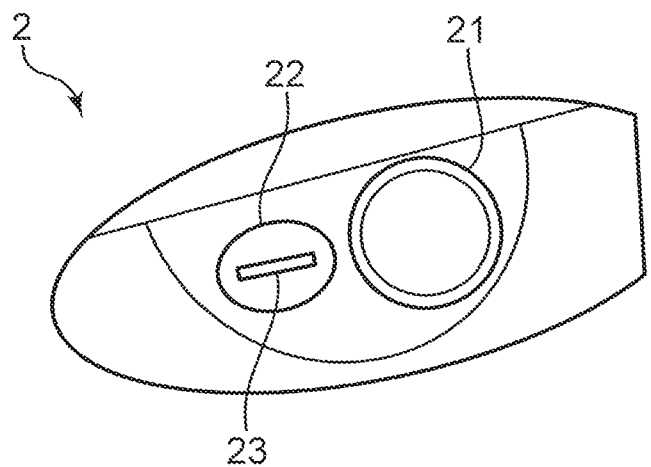
FIG. 2A is a schematic view of an example of a headlight unit.

Hereinafter, a vehicle headlight control device according to embodiments of the present invention will be described in detail with reference to the drawings. First, a vehicle to which the headlight control device of the present embodiment is applied will be described. FIG. 1 is a view schematically showing a vehicle 1 and a detection mode of a pedestrian H existing in front of the vehicle 1. The vehicle 1 is, for example, a four-wheeled vehicle. The vehicle 1 includes a vehicle body 10, a headlight unit 2 (headlight) disposed in a front part of the vehicle body 10, a monocular camera 3 and a millimeter wave radar 4 serving as sensing elements for detecting target information in front of the vehicle 1, and an ECU 5 (vehicle headlight control device; see FIG. 4) for controlling operation of the headlight unit 2.

The headlight unit 2 according to the present embodiment has an illumination function for illuminating a front of the vehicle 1 and a pedestrian marking function for irradiating the pedestrian H existing in front of the vehicle 1 with marking light during nighttime traveling. FIG. 2A is a view schematically showing an example of the headlight unit 2. The headlight unit 2 is disposed in the vicinity of left and right ends in the front part of the vehicle body 10, and FIG. 2A shows a front view of one of them. The headlight unit 2 includes a low beam unit 21 (low beam light source) and a high beam unit 22 (high beam light source).

The low beam unit 21 emits a low beam directed slightly downward in front of the vehicle. The low beam is irradiated in front of the vehicle relatively close to the vehicle 1. The low beam unit 21 includes a light-emitting diode (LED) light source and a reflecting mirror (not shown) for emitting the low beam. The high beam unit 22 emits a high beam directed in a generally horizontal direction in front of the vehicle. The high beam is irradiated in front of the vehicle relatively far from the vehicle 1. The high beam unit 22 includes an LED array 23 as a light source for emitting the high beam.

Figure 2B:
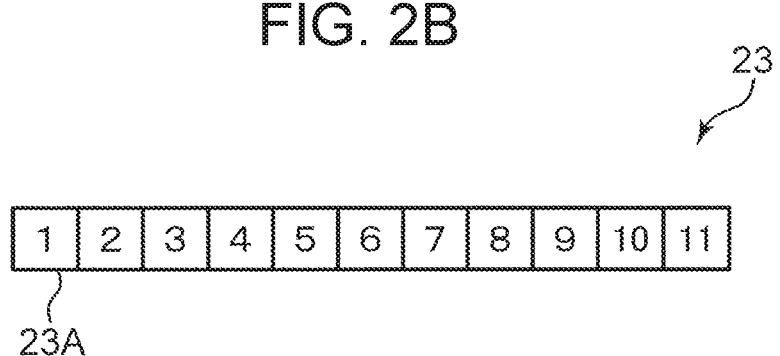
FIG. 2B is a schematic view of an LED array.

FIG. 2B is a schematic view of the LED array 23. The LED array 23 includes a plurality of LED elements 23A having different irradiation ranges (angles) as unit light sources. FIG. 2B shows an example in which the LED elements 23A are disposed in sections with package numbers 1 to 11 arranged in a row in a lateral direction. Of course, it suffices that there is a plurality of the sections, and the number of sections may be fewer or more than eleven. The sections with the package numbers 1 to 11 are sections containing unit light sources that can independently control a light amount of light emission. Therefore, one or more LED elements 23A may be disposed in each of the sections with the package numbers 1 to 11. In addition, the sections containing the unit light sources may be arranged in a matrix of m rows×n columns.

Figure 3:
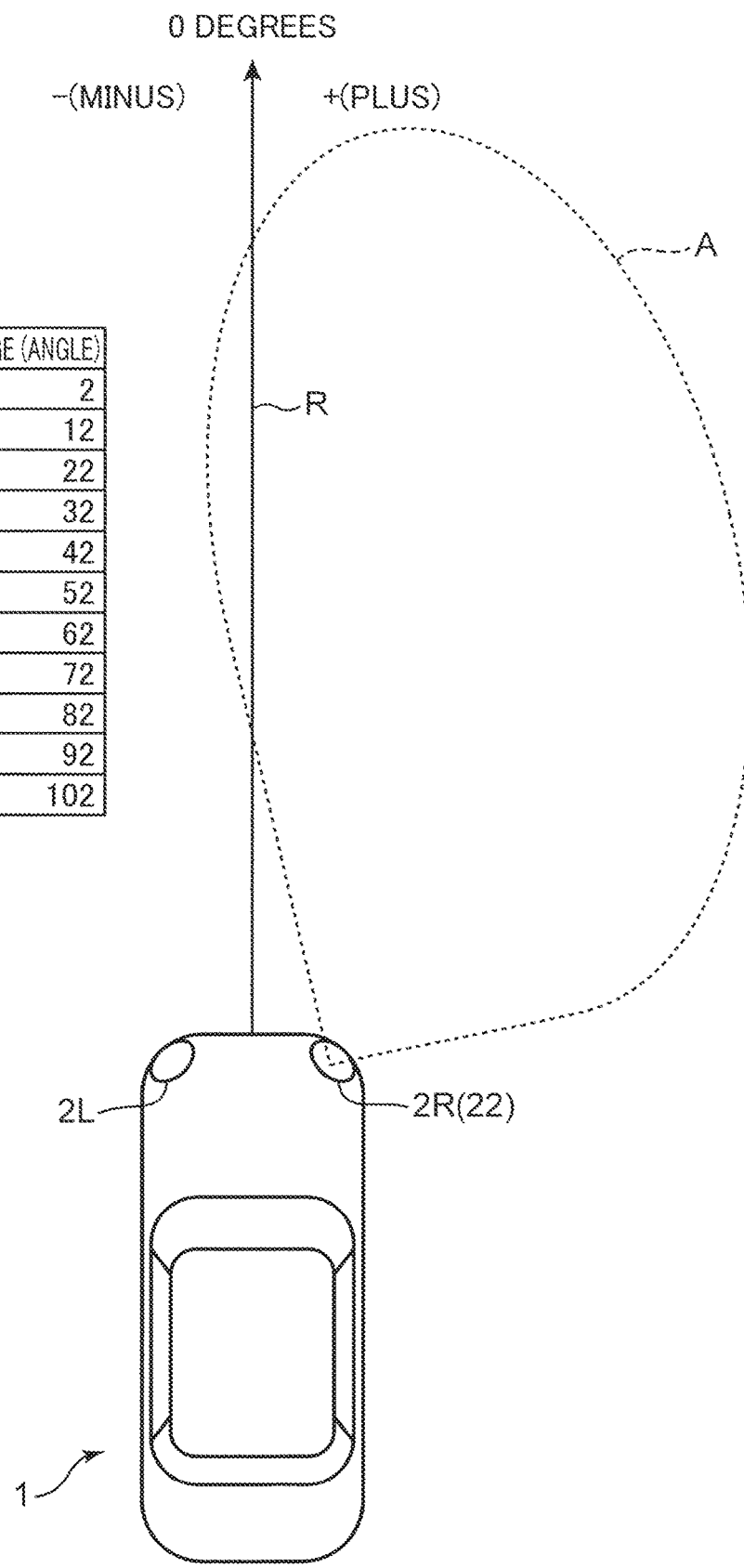
FIG. 3 is a view for explaining an irradiation range of a high beam.

FIG. 3 is a view for explaining an irradiation range of the high beam. FIG. 3 schematically shows a high beam irradiation range A by a right headlight unit 2R (high beam unit 22) out of left and right headlight units 2L, 2R of the vehicle 1, and additionally shows a table indicating an irradiation range (angle) of each LED element 23A. The irradiation angle is indicated by inclination with respect to a traveling line R of the vehicle 1. The high beam irradiation range A is formed by synthesizing high beams emitted from the LED elements 23A with the package numbers 1 to 11.

For example, the LED element 23A with the package number 1 indicates that a limit on a left side in the traveling direction of the irradiation range is −10 degrees and a limit on a right side in the traveling direction thereof is +2 degrees with respect to the traveling line R. In other words, an irradiation range is a range from −10 degrees to +2 degrees. An irradiation range of the LED element 23A with the package number 2 is a range from +0 degrees to +12 degrees and partly overlaps the irradiation range with the package number 1. The same applies to the LED elements 23A with the package number 3 and below.

When all of the LED elements 23A with the package numbers 1 to 11 are lit, a synthesized irradiation range becomes the high beam irradiation range A as shown in FIG. 3, that is, a normal high beam irradiation range. On the other hand, when only a part of the LED elements 23A with the package numbers 1 to 11 is lit, a high beam in a narrow irradiation range is obtained, and when only a part thereof is dimmed, a high beam having a dimming region can be obtained. For example, when only the LED element 23A with the package number 5 is lit, a high beam that irradiates only a range of +30 degrees to +42 degrees in a spotlight manner can be obtained. Conversely, when only that LED element 23A is dimmed, a high beam in which only the range of +30 degrees to +42 degrees becomes the dimming region can be obtained.

Figure 4:
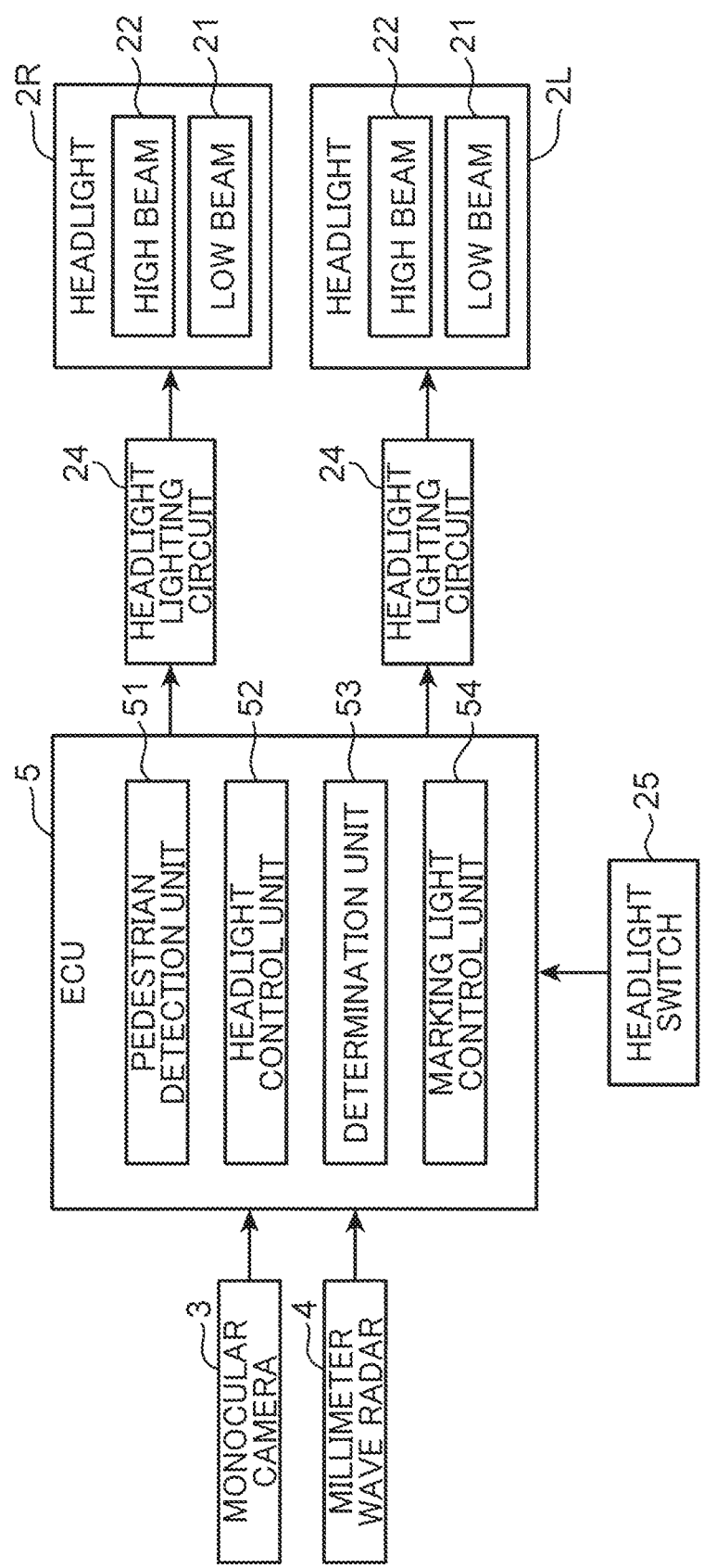
FIG. 4 is a block diagram showing a control configuration of a headlight unit according to a first embodiment.

The monocular camera 3 includes an image sensor such as a CMOS area sensor and is disposed at a predetermined position (for example, in the vicinity of a rearview mirror in a vehicle compartment) of the vehicle 1 to capture an image in front of the vehicle 1. FIG. 1 schematically shows a state in which an optical image 3A of the pedestrian H is imaged by the monocular camera 3. The optical image incident on the image sensor of the monocular camera 3 is photoelectrically converted into image data successively and transmitted to the ECU 5 (FIG. 4).

The millimeter wave radar 4 is a device that transmits a radio wave in a millimeter wave band to a space in front of the vehicle and detects a target existing in front of the vehicle 1 by receiving a reflected wave. The millimeter wave radar 4 is disposed, for example, at a front end (in the vicinity of a front bumper) of the vehicle body 10. FIG. 1 schematically shows an example in which a reflected wave 4A from the pedestrian H is received by the millimeter wave radar 4. Received data of the reflected wave 4A is transmitted to the ECU 5. A position of the pedestrian H can be obtained from distance information obtained from arrival time of the reflected wave 4A, angle information with respect to a reference direction, and the like. Also, based on a radar cross section (RCS) based on the reflected wave 4A, it is possible to discriminate whether the target present ahead is a three-dimensional object or a planar object, and to discriminate whether it is the pedestrian H, an oncoming vehicle, or an obstacle. It is to be noted that the millimeter wave radar 4 is an example of a sensing element for detecting a target by a radio wave, and in place of this, for example, a laser radar can be used.

First Embodiment

<Configuration of Control Apparatus>

FIG. 4 is a block diagram showing a configuration of a control apparatus of the headlight unit 2 (2R, 2L) according to a first embodiment. In the first embodiment, an example in which marking light is formed by using the high beam emitted from the high beam unit 22 is shown. The control apparatus of the first embodiment includes two headlight lighting circuits 24, a headlight switch 25, and the ECU 5 (vehicle headlight control device).

The headlight lighting circuit 24 is incorporated between the ECU 5 and each of the left and right headlight units 2L, 2R, and a lighting control signal is input from the ECU 5. The headlight lighting circuit 24 generates a drive signal for lighting the LED light source of the low beam unit 21 or the LED array 23 of the high beam unit 22 of the headlight units 2L, 2R in accordance with the control signal given from the ECU 5.

The headlight switch 25 is a switch for accepting, from a driver, an operation of switching on/off of the headlight units 2L, 2R and an operation of lighting either the low beam unit 21 or the high beam unit 22. In a case of a vehicle 1 having an auto headlight function of automatically lighting the headlight units 2L, 2R according to environmental illuminance and a function of automatically switching a high beam/low beam according to presence of a pedestrian or an oncoming vehicle, the headlight switch 25 is replaced with a predetermined auto circuit which executes the automatic lighting and the automatic switching function.

The ECU 5 controls irradiation operation by the headlight units 2L, 2R based on the data input from the monocular camera 3 and the millimeter wave radar 4, an operation signal given from the headlight switch 25, and the like. The ECU 5 functionally includes a pedestrian detection unit 51, a headlight control unit 52, a determination unit 53, and a marking light control unit 54 by executing a predetermined operation program.

The pedestrian detection unit 51 detects a position of the pedestrian H in front of the vehicle based on the data (target information) input from the monocular camera 3 and the millimeter wave radar 4. Specifically, the pedestrian detection unit 51 performs image processing such as edge detection processing and pattern recognition processing involving feature amount extraction on the image data acquired by the monocular camera 3, and identifies the pedestrian H. Further, the pedestrian detection unit 51 executes processing of detecting the position of the pedestrian H based on the data (arrival time, azimuth, radar reflection area, etc.) on the reflected wave acquired from the millimeter wave radar 4. When identifying the position of the pedestrian H, the pedestrian detection unit 51 converts the position information into angle information with respect to the traveling line R of the vehicle 1. The pedestrian detection unit 51 sequentially executes such derivation processing of the angle information at predetermined sampling intervals. The angle information is utilized at the time of irradiation with marking light to be described later.

By using the monocular camera 3 and the millimeter wave radar 4 in combination, it is possible to detect the pedestrian H with high accuracy and at high speed. It is possible to distinguish a three-dimensional object from a planar object based on the data on the reflected wave of the millimeter wave radar 4. Then, by narrowing down an image region for searching for a person from the image data of the monocular camera 3 to a region of the three-dimensional object, image processing time can be shortened. In addition, detection of the pedestrian H is performed with the two sensing elements, so that detection accuracy is also improved.

The headlight control unit 52 controls the irradiation operation of the headlight unit 2 (2L, 2R) through the headlight lighting circuit 24. The headlight control unit 52 turns on the low beam unit 21 or the high beam unit 22 of the headlight unit 2 according to the operation given to the headlight switch 25 (or according to the control signal of the auto circuit).

The determination unit 53 determines whether an irradiation state of the headlight unit 2 is the high beam or the low beam. In other words, it is determined whether the headlight control unit 52 turns on either the low beam unit 21 or the high beam unit 22 of the left and right headlight units 2L, 2R at present.

The marking light control unit 54 generates required marking light for executing pedestrian marking by controlling an irradiation state of the high beam unit 22. In the present embodiment, instead of using a light source dedicated to marking light, the marking light control unit 54 irradiates the pedestrian H with the marking light by controlling lighting of the LED array 23 of the high beam unit 22 in units of the LED elements 23A. Note that, in the present embodiment, the marking light control unit 54 and the headlight control unit 52 correspond to "headlight control unit" in the claims.

The marking light control unit 54 executes the following first control and second control according to the irradiation state of the headlight unit 2.

First control: When the pedestrian detection unit 51 detects the pedestrian H while the determination unit 53 determines that the irradiation state is "low beam", the irradiation state of the high beam (LED array 23) is controlled so that the pedestrian H is irradiated with a part of the high beam in a spotlight manner.

Second control (dimming control): When the pedestrian detection unit 51 detects the pedestrian H within a high beam irradiation range while the determination unit 53 determines that the irradiation state is "high beam", the irradiation state of the high beam (LED array 23) is controlled so that a periphery of the pedestrian H is dimmed.

<Specific Example of Pedestrian Marking>

Figure 5:
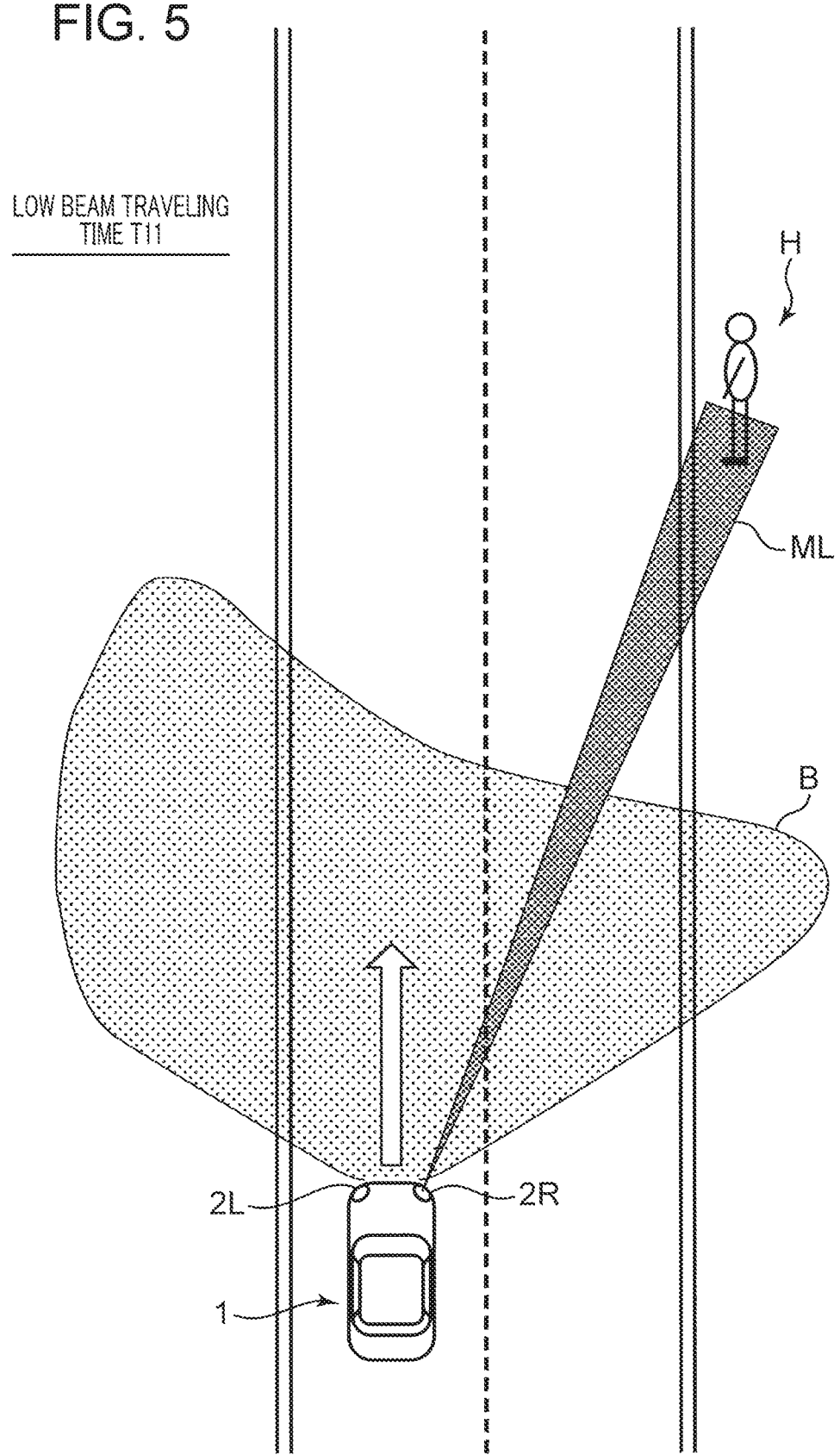
FIG. 5 is a view showing pedestrian marking during low beam traveling.
Figure 6:
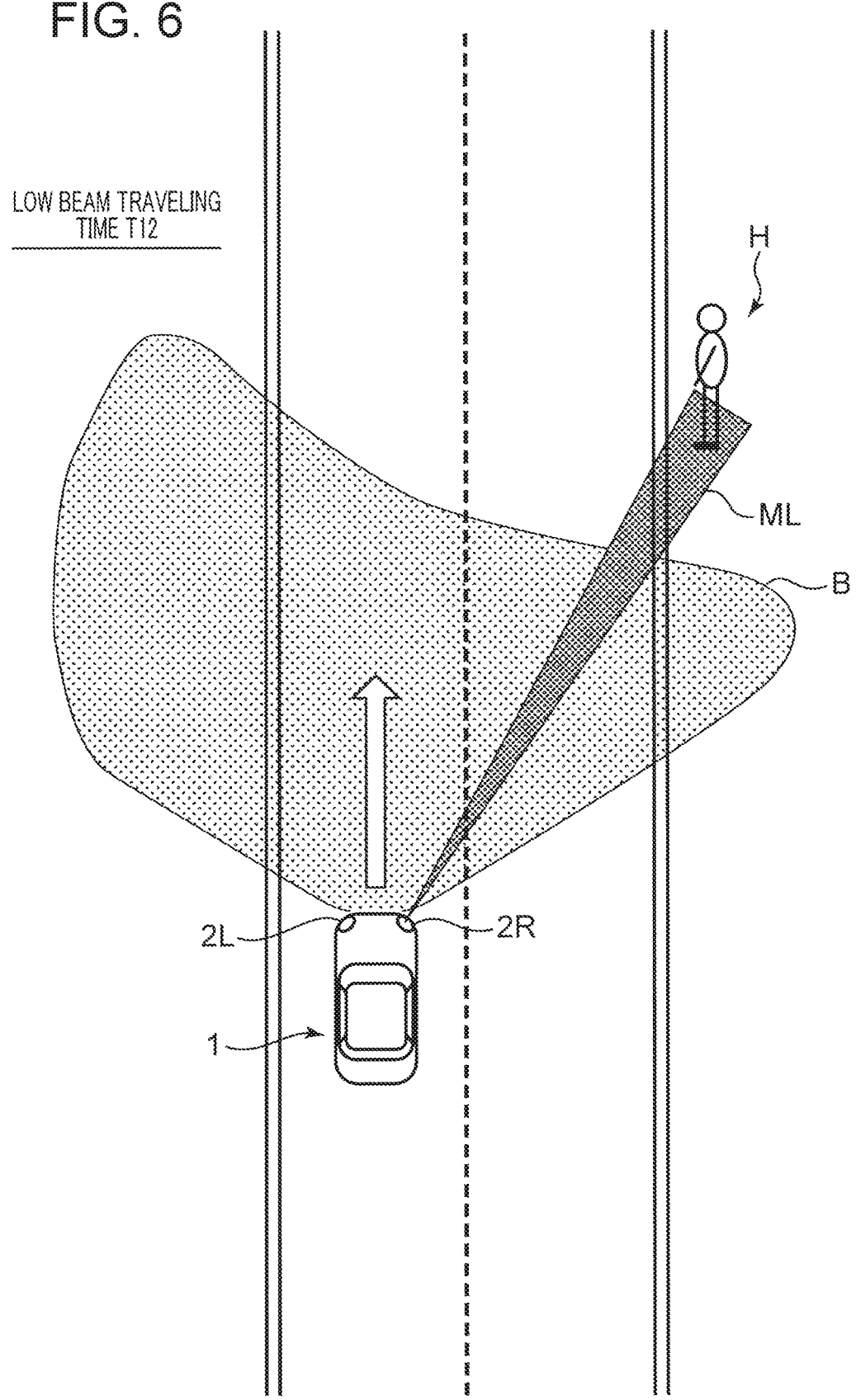
FIG. 6 is a view showing pedestrian marking during the low beam traveling.
Figure 7:
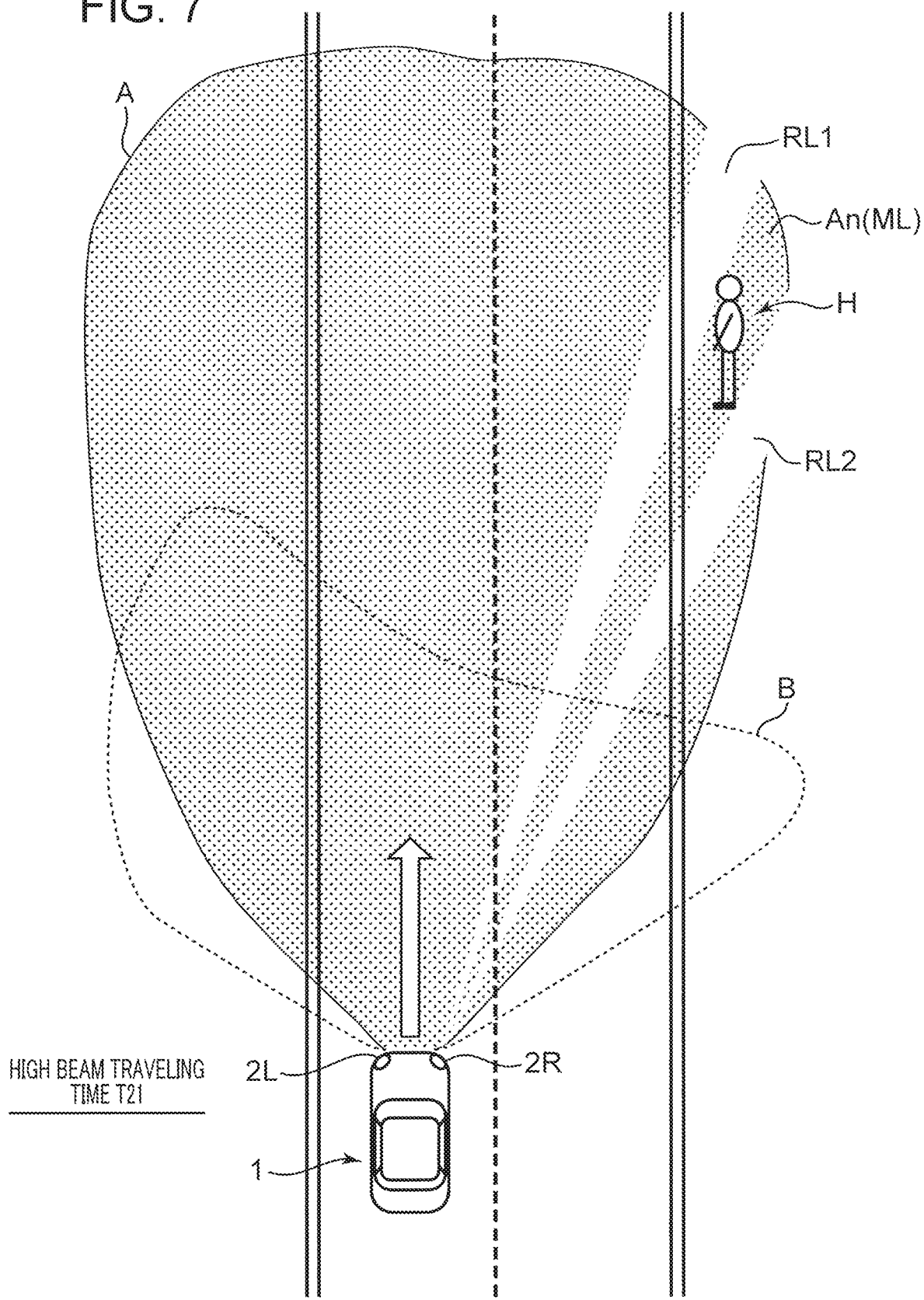
FIG. 7 is a view showing pedestrian marking during high beam traveling.
Figure 8:
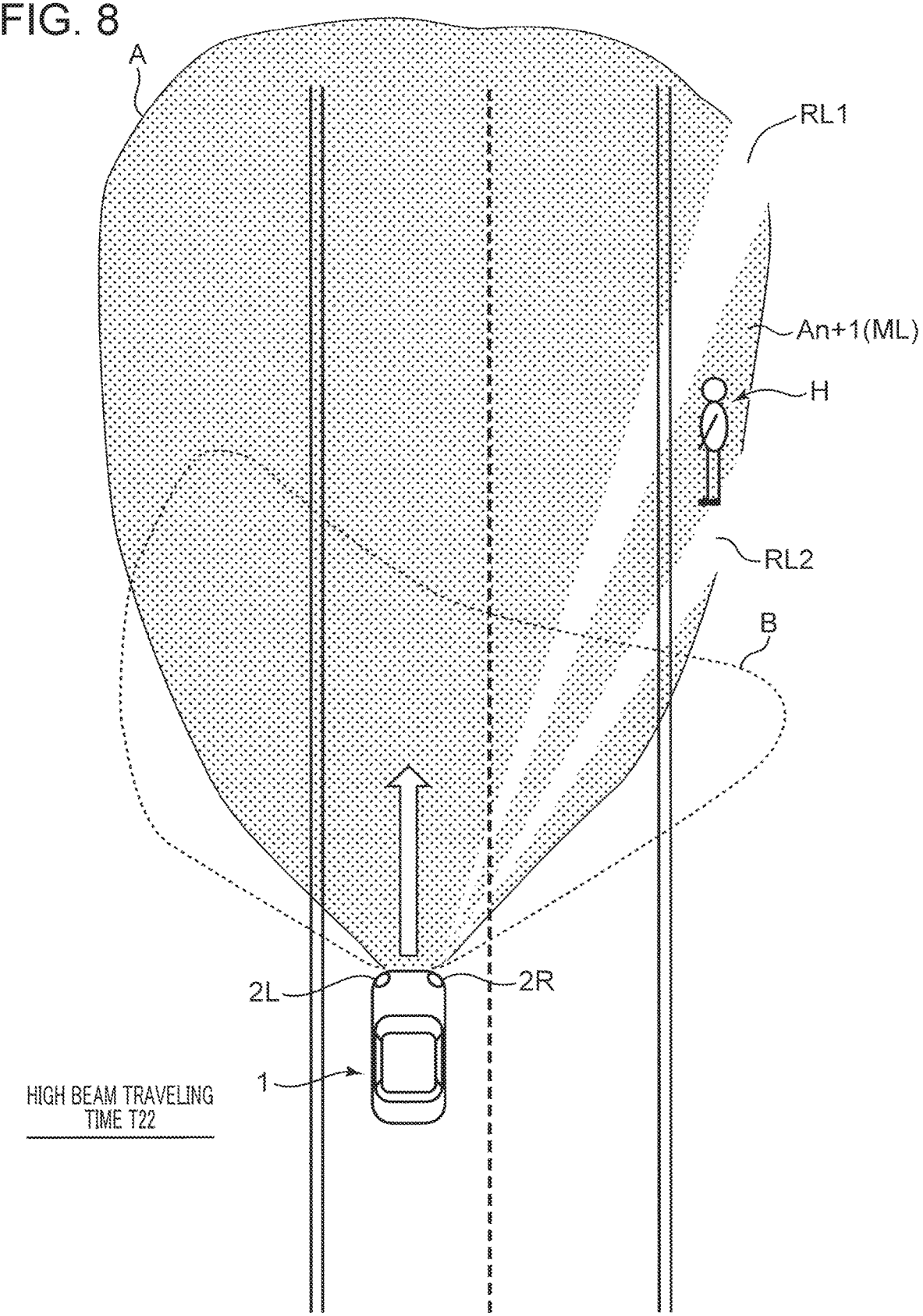
FIG. 8 is a view showing pedestrian marking during the high beam traveling.
Figure 9:
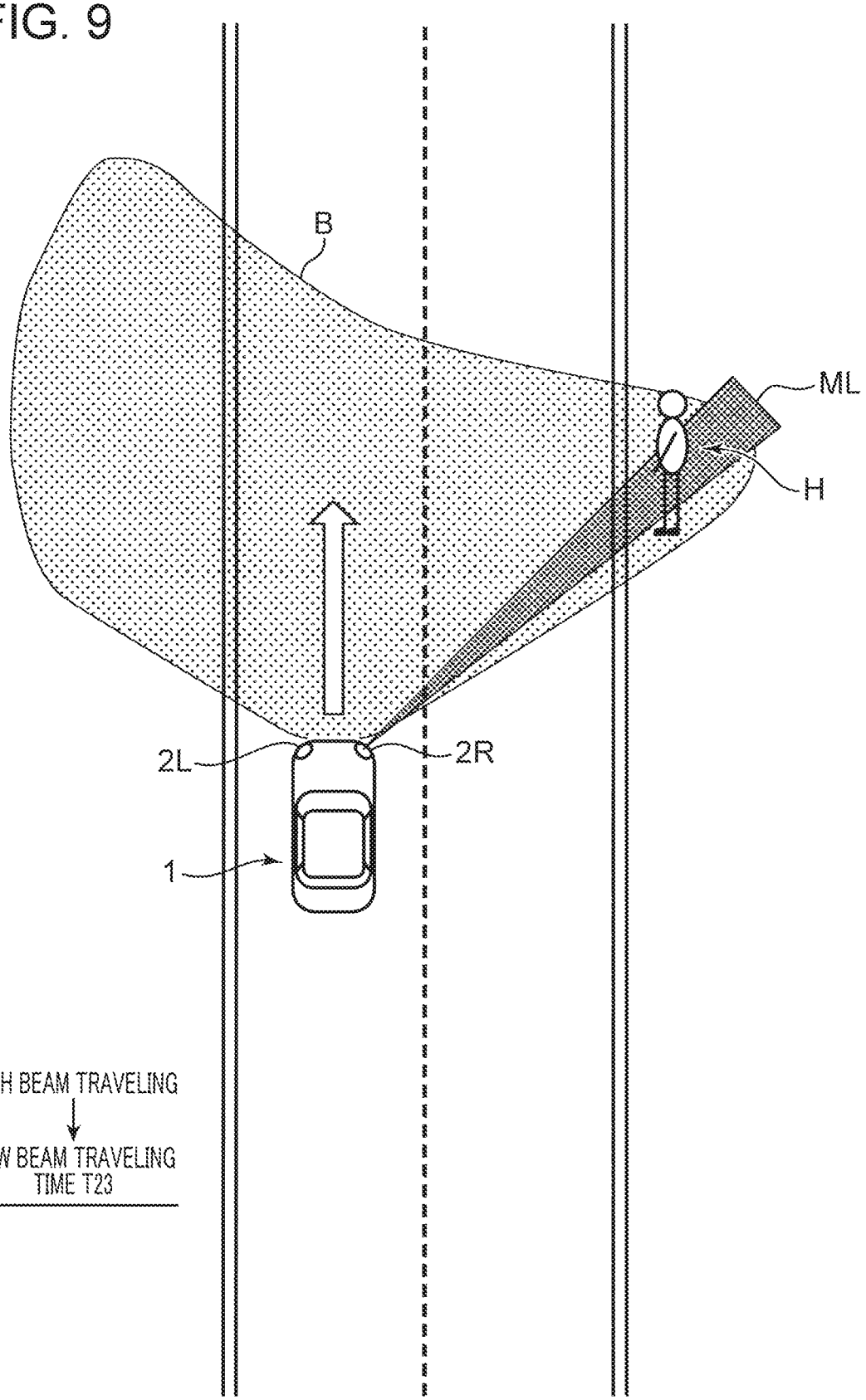
FIG. 9 is a view showing pedestrian marking at the time of switching from the high beam traveling to the low beam traveling.

Hereinafter, specific examples of the pedestrian marking by the first control and the second control will be described with reference to FIGS. 5 to 9. FIGS. 5 and 6 are views showing pedestrian marking in a state in which the vehicle 1 performs low beam traveling, FIGS. 7 and 8 are views showing pedestrian marking in a state in which the vehicle 1 performs high beam traveling, and FIG. 9 is a view showing pedestrian marking at the time of switching from the high beam traveling to the low beam traveling. These drawings simply show that a range illuminated by the high beam unit 22 is set as the high beam irradiation range A and a range illuminated by the low beam unit 21 is set as the low beam irradiation range B.

FIG. 5 shows an irradiation state of the headlight units 2R, 2L at a certain time T11 during the low beam traveling of the vehicle 1. At the time T11, it is assumed that the monocular camera 3 and the millimeter wave radar 4 detect that the pedestrian H is present on a sidewalk on an opposite lane side in front of the vehicle 1. Since the low beam traveling is performed, a headlight status of the headlight units 2R, 2L is the low beam irradiation range B. In other words, the headlight control unit 52 turns on the low beam unit 21, and the determination unit 53 determines that the irradiation state is "low beam". Therefore, the marking light control unit 54 executes the "first control".

Based on position information of the pedestrian H at the time T11 (angle information with respect to the vehicle 1), the marking light control unit 54 determines which of the plurality of LED elements 23A included in the LED array 23 of the high beam unit 22 is lit. In this determination, the irradiation range (angle) of each LED element 23A as shown in FIG. 3 is referred. For example, when the pedestrian H is present at an azimuth of 35 degrees with respect to the traveling line R at the time T11, the LED element 23A with the package number 5 of the right headlight unit 2R is lit. As a result, the right headlight unit 2R also emits marking light ML that irradiates the pedestrian H in a spotlight manner in addition to the current low beam. When the pedestrian H is irradiated with the marking light ML, the pedestrian H stands out in the dark. Therefore, a driver of the vehicle 1 can easily recognize the pedestrian H existing outside the low beam irradiation range B.

FIG. 6 shows an irradiation state of the headlight units 2R, 2L at time T12 (the low beam traveling is continued) after a lapse of a certain time from the time T11. Since the vehicle 1 advances with time and the pedestrian H also moves, a relative position between the vehicle 1 and the pedestrian H also changes. The marking light control unit 54 determines the LED element 23A to be lit based on position information of the pedestrian H at the time T12. For example, when the relative position has changed so that the pedestrian H exists at an azimuth of 45 degrees with respect to the traveling line R at the time T12, the LED element 23A with the package number 6 of the right headlight unit 2R is lit. Accordingly, the pedestrian H is irradiated with the marking light ML emitted from the LED element 23A with the package number 6. In this manner, the LED elements 23A to be lit are sequentially shifted according to the change in the relative position between the vehicle 1 and the pedestrian H, and the pedestrian marking is continued until the vehicle 1 and the pedestrian H pass each other.

FIG. 7 shows an irradiation state of the headlight units 2R, 2L at a certain time T21 during high beam traveling of the vehicle 1. At the time T21, it is assumed that the monocular camera 3 and the millimeter wave radar 4 detect that the pedestrian H is present on a sidewalk on an opposite lane side in front of the vehicle 1. Since the high beam traveling is performed, the headlight status of the headlight units 2R, 2L is the high beam irradiation range A. In other words, the headlight control unit 52 turns on the high beam unit 22, and the determination unit 53 determines that the irradiation state is "high beam". Accordingly, the marking light control unit 54 executes the "second control".

Based on position information of the pedestrian H at the time T21, the marking light control unit 54 determines which of the plurality of LED elements 23A included in the LED array 23 of the high beam unit 22 is dimmed. In other words, in the high beam traveling, all of the plurality of LED elements 23A are lit, and the LED element 23A having the irradiation range around the pedestrian H among them is designated as a dimming target. On the other hand, the LED element 23A having the irradiation range at the position where the pedestrian H exists is not designated as the dimming target. Here, various modes of dimming can be adopted, and, for example, it is possible to exemplify a mode in which an amount of luminescence of the LED element 23A to be dimmed is reduced to 50% or less compared to a normal state, or a mode in which the LED element 23A is turned off For example, it is assumed that the pedestrian H exists at an azimuth of 35 degrees with respect to the traveling line R at the time T21. In this case, the LED element 23A with the package number 5 whose irradiation range includes the azimuth of 35 degrees of the right headlight unit 2R is not designated as the dimming target. On the other hand, the LED elements 23A with the package numbers 4 and 6 adjacent to the package number 5 are designated as the dimming targets (partial dimming of the unit light sources). Of course, in addition to the LED element 23A with the package number 5, LED elements 23A other than those with the package numbers 4 and 6 are also not designated as the dimming targets.

As a result, dimming regions RL1, RL2 caused by dimming the LED elements 23A with the package numbers 4 and 6 are formed around the pedestrian H, that is, on both sides of the pedestrian H (a side closer to the traveling line and a side opposite thereto). In addition, since the pedestrian H exists in an irradiation range An of the LED element 23A with the package number 5, a state is provided as if the pedestrian H is irradiated with the marking light ML. In other words, by executing marking dimming that creates the dimming regions RL1, RL2 on both sides of the pedestrian H, a state where the pedestrian H is substantially irradiated with the spotlight-like high beam is formed.

When the pedestrian H is irradiated with a normal high beam produced by the fully lit LED array 23, since an entire space in front of the vehicle 1 is illuminated, contrast in brightness between the pedestrian H and his/her surroundings is relatively low. On the other hand, as the periphery of the pedestrian H is dimmed, the contrast between the pedestrian H and his/her surroundings is increased, and the pedestrian H can be noticed. Therefore, the driver of the vehicle 1 can easily recognize the pedestrian H existing in the high beam irradiation range A.

FIG. 8 shows an irradiation state of the headlight units 2R, 2L at time T22 (the high beam traveling is continued) after a certain time has passed from the time T21. Since a relative position between the vehicle 1 and the pedestrian H also changes with the lapse of time, the marking light control unit 54 determines the LED element 23A to be dimmed based on position information of the pedestrian H at the time T22. For example, it is assumed that the relative position has changed so that the pedestrian H exists at an azimuth of 45 degrees with respect to the traveling line R at the time T22. In this case, the LED element 23A with the package number 6 of the right headlight unit 2R has an irradiation range An+1 corresponding to the required marking light ML. Therefore, at the time T22, the marking light control unit 54 does not designate the LED element 23A with the package number 6 as the dimming target, but designates the LED elements 23A with the package numbers 5 and 7 adjacent to the one with the package number 6 as the dimming targets. As a result, the pedestrian H is irradiated with the high beam emitted from the LED element 23A with the package number 6. In this way, the LED elements 23A to be dimmed are sequentially shifted in accordance with the change in the relative position between the vehicle 1 and the pedestrian H, and the pedestrian marking is continued until the vehicle 1 and the pedestrian H pass each other.

FIG. 9 shows an example of pedestrian marking that can be executed, in place of the headlight switch 25, when the auto circuit realizing the automatic switching function of the high beam/low beam is installed in the vehicle 1. FIG. 9 shows an irradiation state of the headlight units 2R, 2L at time T23 when time has further elapsed from the time T22 in FIG. 8. In a case where the automatic switching function is provided, when the pedestrian detection unit 51 detects that the pedestrian H enters the low beam irradiation range B from the high beam irradiation range A, the headlight control unit 52 automatically switches the irradiation state of the headlight units 2L, 2R from the high beam to the low beam. In other words, automatic switching from the high beam traveling at the time T22 to low beam traveling is performed. FIG. 9 shows a state after this automatic switching, and the headlight status of the headlight units 2R, 2L is the low beam irradiation range B.

At the time T23, the marking light control unit 54 controls the irradiation state of the high beam unit 22 so that the pedestrian H is irradiated with a part of the high beam in a spotlight manner as pedestrian marking. In other words, similarly to the first control described above, the marking light control unit 54 designates the LED element 23A to be lit among the plurality of LED elements 23A of the LED array 23 based on position information of the pedestrian H at the time T23. Then, marking light ML is generated by lighting the designated LED element 23A, and the pedestrian H is irradiated. As a result, contrast between the pedestrian and his/her surroundings is enhanced by overlappingly irradiating with the marking light ML, as compared with a case where the pedestrian H is simply irradiated with the low beam. Therefore, the pedestrian H can stand out under the irradiation with the low beam.

<Description of Operation Flow>

Figure 10A:
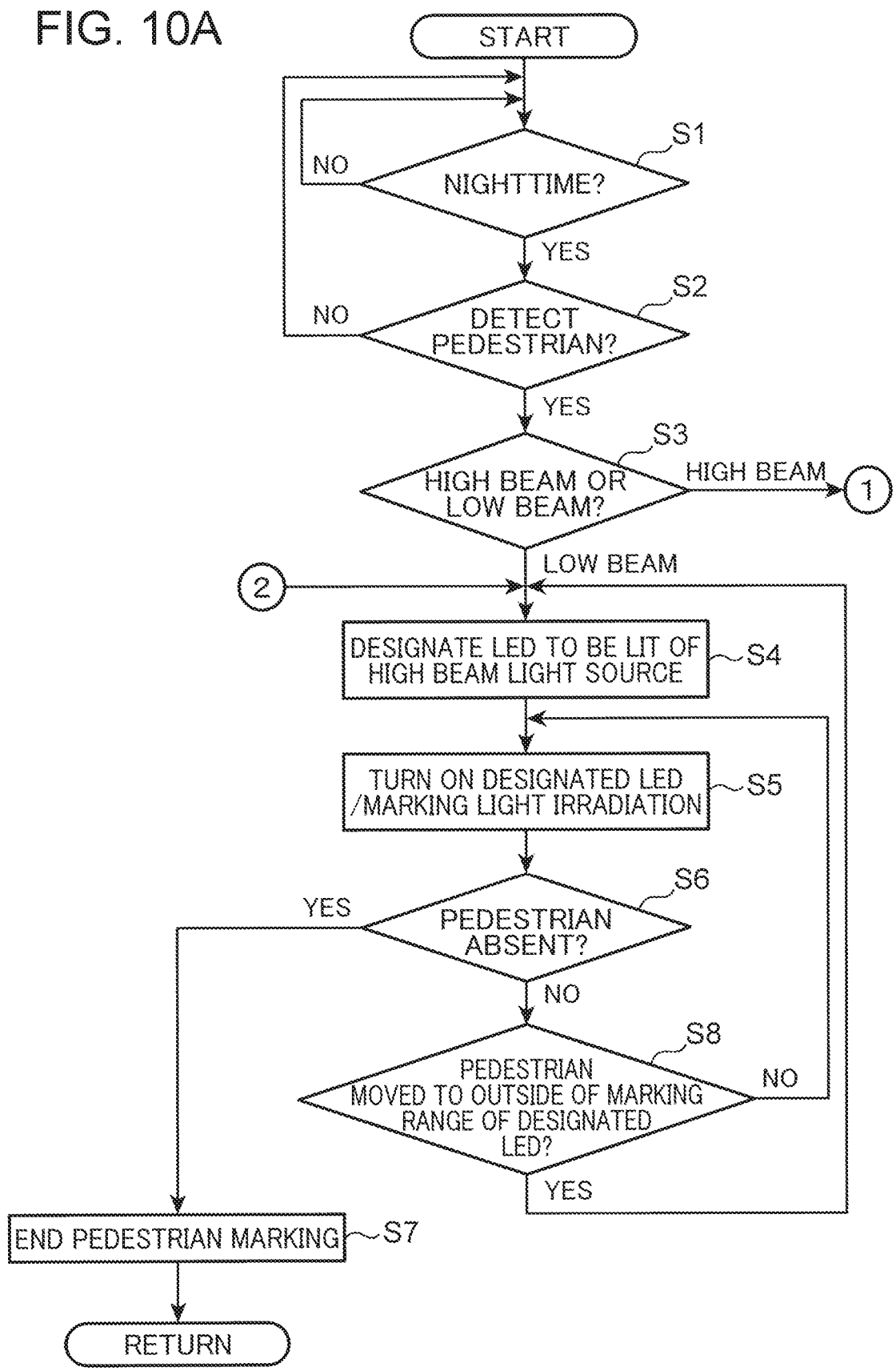

FIGS. 10A and 10B are flowcharts showing pedestrian marking operation according to the first embodiment. The ECU 5 executes pedestrian marking when the vehicle 1 travels at night. It should be noted that the monocular camera 3 and the millimeter wave radar 4 always operate when the vehicle 1 travels and the pedestrian detection unit 51 constantly executes detection operation of the pedestrian H. Note that, in the following description, an operation flow will be described assuming that the vehicle 1 has the auto circuit for automatically lighting and switching the high beam/low beam.

First, based on a detection result of a sensor (not shown) for detecting brightness of traveling environment of the vehicle 1, the ECU 5 determines whether or not it is nighttime (including dusk) (step S1). If it is determined that it is not the nighttime (NO in step S1), the ECU 5 stands by. If it is determined that it is the nighttime (YES in step S1), it is determined whether or not the pedestrian detection unit 51 detects the pedestrian H (step S2). Here, when it is determined that it is the nighttime, the auto circuit automatically turns on the headlight units 2L, 2R.

If the pedestrian detection unit 51 does not detect the pedestrian H (NO in step S2), the ECU 5 stands by. On the other hand, if the pedestrian detection unit 51 detects the pedestrian H (YES in step S2), the pedestrian marking is started. In this case, the determination unit 53 determines whether an irradiation state of the headlight units 2L, 2R is high beam or low beam (step S3). If the irradiation state is "low beam", that is, if the headlight control unit 52 turns on the low beam unit 21, the marking light control unit 54 executes the above-mentioned "first control".

Based on position (angle) information of the pedestrian H derived by the pedestrian detection unit 51, the marking light control unit 54 designates an LED element 23A to be lit among the plurality of LED elements 23A included in the LED array 23 as the high beam light source (step S4). Then, the marking light control unit 54 outputs a control signal to the headlight lighting circuit 24 so as to turn on the designated LED element 23A (step S5). As a result, as illustrated in FIG. 5, the pedestrian H is irradiated with the marking light ML under the irradiation of the low beam.

Subsequently, based on a detection result of the pedestrian detection unit 51, it is confirmed whether or not the pedestrian H has deviated from a range to be marked (pedestrian absence) (step S6). For example, when the pedestrian H greatly moves away from a roadway, the pedestrian marking is no longer necessary. Accordingly, if it is determined that the pedestrian is absent (YES in step S6), the ECU 5 ends the pedestrian marking (step S7).

If the pedestrian detection unit 51 continues to detect presence of the pedestrian H within a range where the pedestrian marking is required (NO in step S6), the marking light control unit 54 determines whether the pedestrian H has relatively moved to outside of a marking range (irradiation range) of the LED element 23A designated in step S4 (step S8). In the example of FIG. 5, it is confirmed whether or not the pedestrian H has moved to outside of the irradiation range of the LED element 23A with the package number 5. If the pedestrian H has not yet deviated from the irradiation range (NO in step S8), the lighting of the LED element 23A with the package number 5 is continued, and a process returns to step S5 to continue processing.

On the other hand, if the pedestrian H has moved to a position deviated from the irradiation range of the designated LED element 23A (YES in step S8), the marking light control unit 54 newly designates an LED element 23A to be lit according to position information of the pedestrian H at that time (return to step S4). For example, as shown in FIG. 6, when the pedestrian H relatively moves to an irradiation range of the LED element 23A with the package number 6, the marking light control unit 54 designates the LED element 23A with the package number 6, and lights this. Note that when the pedestrian H exists near a border between irradiation ranges of adjacent LED elements 23A, both of the adjacent LED elements 23A may be lit.

In step S3, if the irradiation state is "high beam", that is, if the headlight control unit 52 turns on the high beam unit 22, the marking light control unit 54 executes the "second control" described above. As a matter of course, this second control is executed on the premise that the pedestrian detection unit 51 detects the pedestrian H within the irradiation range of the high beam (headlight).

Based on position information of the pedestrian H derived by the pedestrian detection unit 51, the marking light control unit 54 designates an LED element 23A to be dimmed (extinguished) among the plurality of LED elements 23A in a full lighting state (step S9). Then, the marking light control unit 54 outputs a control signal to the headlight lighting circuit 24 so as to dim the designated LED element 23A (step S10). As a result, as shown in FIG. 7, under high beam irradiation, marking dimming to create the dimming regions RL1, RL2 is formed on both sides of the pedestrian H. As a result, the high beam emitted from the LED element 23A (the LED element 23A with the package number 5 in the example of FIG. 7) having the irradiation range An between the dimming regions RL1, RL2 becomes the substantial marking light ML, and the pedestrian H is marked.

Subsequently, as in step S6, based on a detection result of the pedestrian detection unit 51, it is confirmed whether or not the pedestrian H has deviated from a range to be marked (pedestrian absence) (step S11). If it is determined that the pedestrian is absent (YES in step S11), the ECU 5 ends the pedestrian marking (step S12).

If the pedestrian detection unit 51 continues to detect presence of the pedestrian H within a range where the pedestrian marking is required (NO in step S11), the marking light control unit 54 determines whether the pedestrian H has relatively moved to outside of a marking range (irradiation range) of the LED element 23A located between the pair of LED elements 23A designated for dimming in step S9 (step S13). In the example of FIG. 7, it is confirmed whether or not the pedestrian H has moved to outside of the irradiation range of the LED element 23A with the package number 5. If the pedestrian H has not yet deviated from the irradiation range (NO in step S13), the dimming of the LED elements 23A with the package numbers 4 and 6 is continued, and the process returns to step S10 to continue the processing.

On the other hand, if the pedestrian H has moved to a position deviated from the irradiation range of the LED element 23A located between the LED elements 23A designated for dimming (YES in step S13), it is determined whether the pedestrian H is located in the low beam irradiation range B (step S14). If the pedestrian H is located within the high beam irradiation range A (NO in step S14), the marking light control unit 54 newly designates an LED element 23A to be lit according to position information of the pedestrian H at that time (return to step S9). For example, as shown in FIG. 8, when the pedestrian H relatively moves to an irradiation range of the LED element 23A with the package number 6, the marking light control unit 54 designates the LED elements 23A with the package numbers 5 and 7 as dimming targets, and dims them.

If the pedestrian H is located within the low beam irradiation range B (YES in step S14), the control illustrated in FIG. 9 is executed. In this case, the headlight control unit 52 switches the irradiation state of the headlight units 2L, 2R from the high beam to the low beam (step S15). Then, the marking light control unit 54 proceeds to step S4 and executes pedestrian marking processing during low beam traveling.

<Effects>

According to the control apparatus of the headlight unit 2 according to the first embodiment described above, the marking light ML is generated by controlling the irradiation state of the LED array 23 included in the high beam unit 22. Therefore, it is possible to reduce the number of parts as compared with a case of using a light source dedicated to marking light. In the pedestrian marking, during the low beam traveling, the pedestrian H is irradiated with the high beam emitted from the designated LED element 23A as the marking light in a spotlight manner. As a result, the pedestrian H becomes prominent in the dark. On the other hand, during the high beam traveling, the irradiation state of the high beam is controlled so that only the periphery of the pedestrian H is dimmed. By such marking dimming, contrast in brightness between the pedestrian H and his/her surroundings is enhanced. Therefore, it is possible to make the pedestrian H to be marked stand out not only during low beam irradiation but also during high beam irradiation.

Further, as illustrated in FIG. 9, when the pedestrian H enters the low beam irradiation range B from the high beam irradiation range A, the front of the vehicle 1 is totally illuminated by the low beam irradiation, and the pedestrian H is irradiated with a part of the high beam in a spotlight manner. In other words, overall luminance ahead of the vehicle is secured by the low beam irradiation, and the marking irradiation of the pedestrian H with the high beam further enhances the contrast between the pedestrian H and his/her surroundings. Therefore, the pedestrian H can stand out under the low beam irradiation.

Second Embodiment

Figure 11:
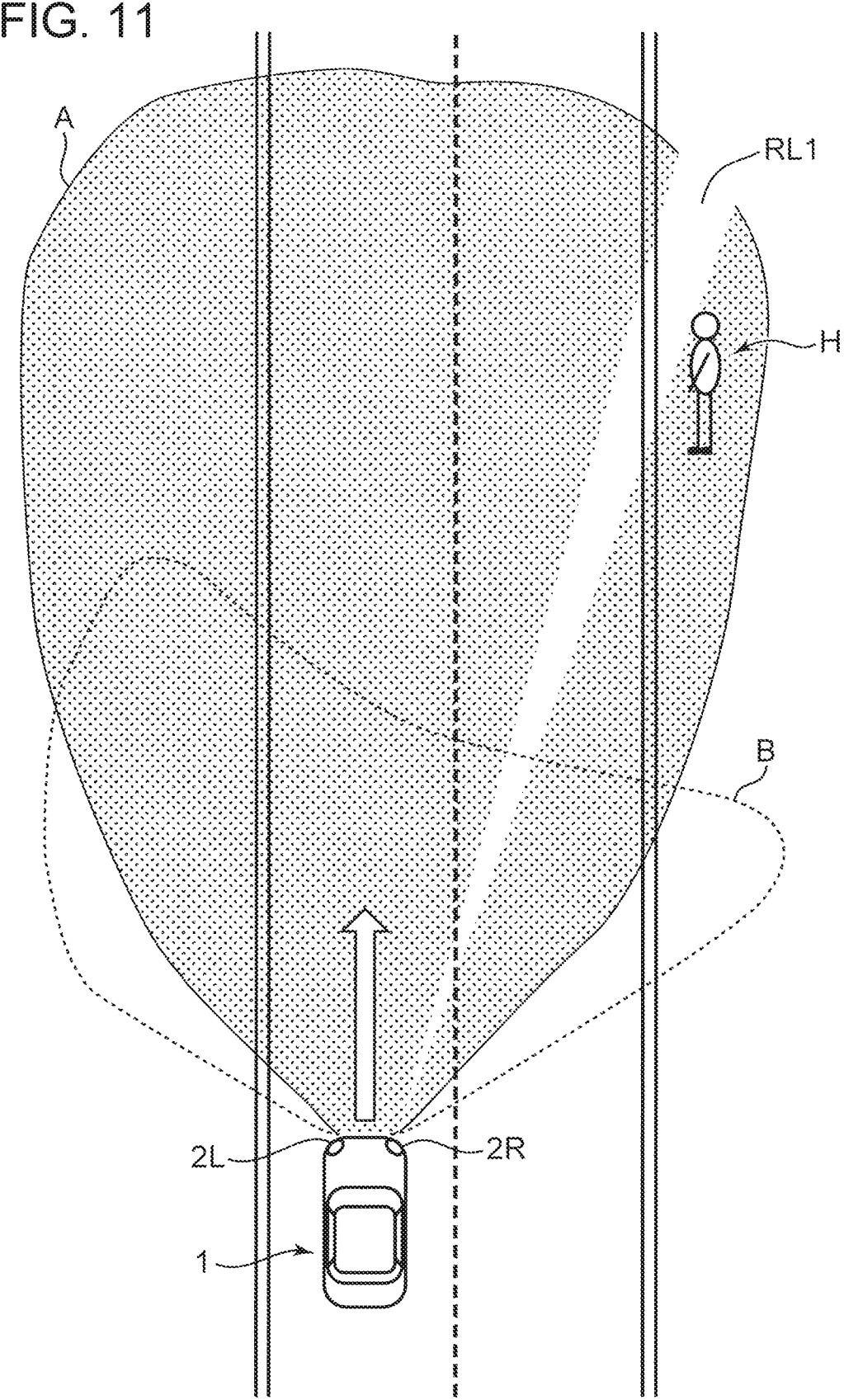
FIG. 11 is a view showing pedestrian marking according to a second embodiment.

FIG. 11 is a view showing pedestrian marking according to a second embodiment. A configuration of a control apparatus of a headlight unit 2 according to the second embodiment is the same as that shown in the block diagram of FIG. 4 described in the above-described first embodiment. A difference is a mode of marking dimming around a pedestrian H in a case where the second control is executed. In the second embodiment, in pedestrian marking at the time of high beam traveling, a marking light control unit 54 performs control for dimming a side, of both sides of the pedestrian H, closer to a traveling line of a vehicle.

For example, in the first embodiment shown in FIG. 7, the example in which the marking light control unit 54 sets the LED elements 23A with the package numbers 4 and 6 as the dimming targets and does not set the LED element 23A with the package number 5 therebetween as the dimming target is given. When this is replaced with the second embodiment, the marking light control unit 54 sets only the LED element 23A with the package number 4 as a dimming target, and as shown in FIG. 11, forms a dimming region RL1 on the side, of the pedestrian H, closer to the traveling line of the vehicle. In this way, even if the dimming region RL1 is provided only on one side of the pedestrian H, contrast between a region where the pedestrian H exists and an adjacent region thereof is enhanced, so that it is possible to make the pedestrian H stand out during the high beam traveling.

Normally, the pedestrian H is detected not on the traveling line but in any one of left and right regions of the traveling line. In other words, the pedestrian H is detected on a sidewalk on a side of a roadway, in a roadside zone, or at a road edge. In general, as an orientation distribution of the high beam spreads to left and right from the traveling line, luminance tends to decrease. In other words, of both sides of the pedestrian H viewed from the vehicle 1, the side closer to the traveling line has higher luminance. Therefore, contrast between the pedestrian and his/her surroundings can be further enhanced by dimming the closer side.

This second embodiment is preferably applicable to a case where it is not possible to select an irradiation range of a high beam with high resolution and it is difficult to dim both sides of the pedestrian H, for example. FIG. 3 shows the example in which the LED array 23 is composed of eleven LED elements 23A and the irradiation angle of each LED element 23A is 12 degrees. On the other hand, when an LED array 23 has about five LED elements 23A, an irradiation angle of each LED element 23A must be increased to about 25 degrees to 30 degrees. In such a case, if the two LED elements 23A are dimmed, there is a concern that a high beam itself becomes dark and overall visibility in front of the vehicle deteriorates. Therefore, as in the second embodiment, it is desirable to dim only the LED element 23A corresponding to one side of the pedestrian H, which is more advantageous for improving contrast.

Third Embodiment

Figure 12:
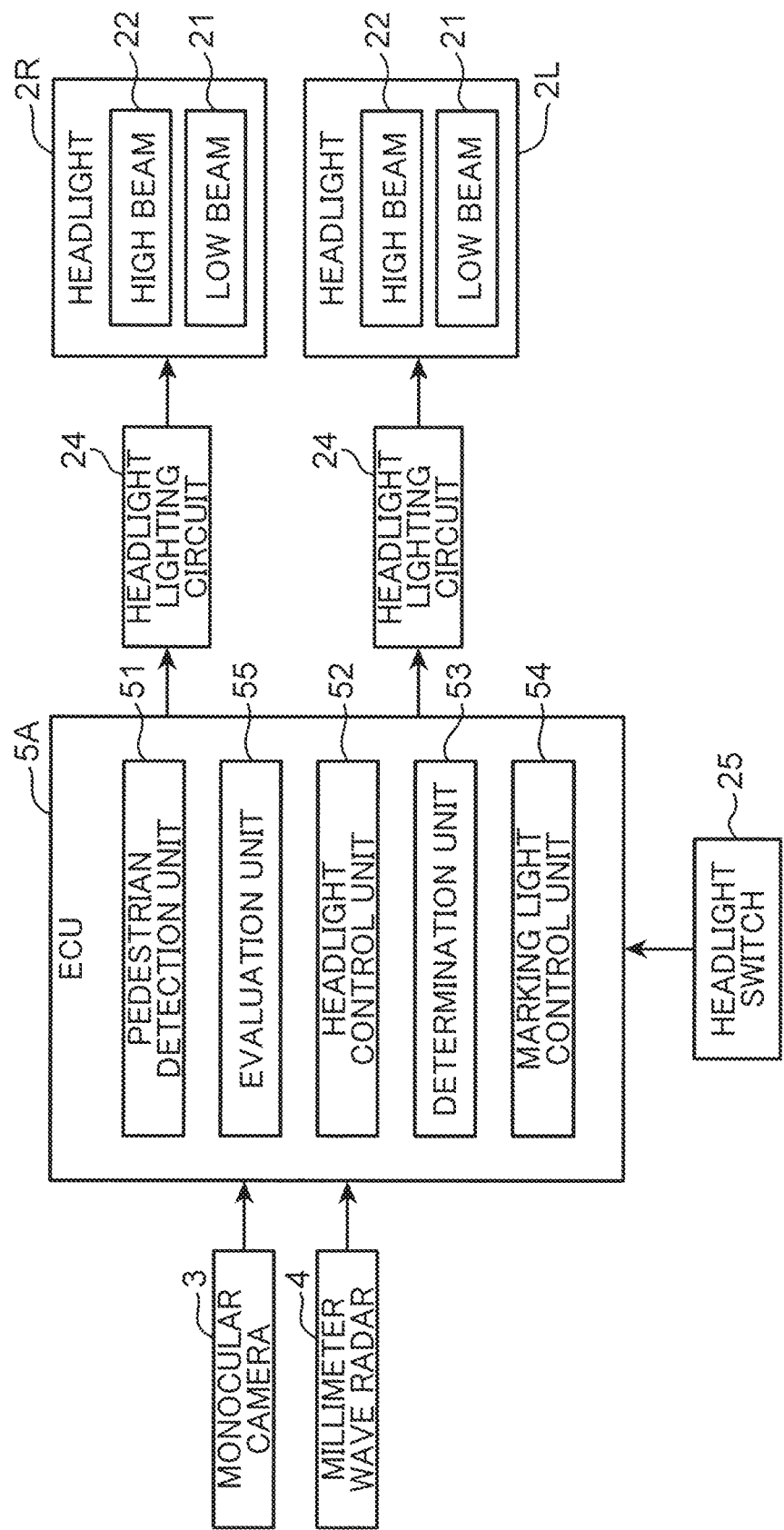
FIG. 12 is a block diagram showing a control configuration of a headlight unit according to a third embodiment.

In the first and second embodiments, the pedestrian marking in the case where the single pedestrian H exists in front of the vehicle has been exemplified. In a third embodiment, pedestrian marking in a case where a plurality of pedestrians H is present in front of the vehicle is exemplified. FIG. 12 is a block diagram showing a control configuration of a headlight unit according to the third embodiment. A difference from the block diagram of FIG. 4 shown in the above-described first embodiment lies in that an ECU 5A of the third embodiment further includes an evaluation unit 55.

When the plurality of pedestrians H is detected during high beam traveling, in order to determine the pedestrian H to whom the pedestrian marking is executed, the evaluation unit 55 derives an evaluation value for each of the detected plurality of pedestrians H. In this third embodiment, among the plurality of pedestrians H, the highest evaluation value is given to the pedestrian H closest to the vehicle 1. Then, the marking light control unit 54 executes the pedestrian marking exemplified in the above-described first embodiment to the pedestrian H given the highest evaluation value.

Figure 13:
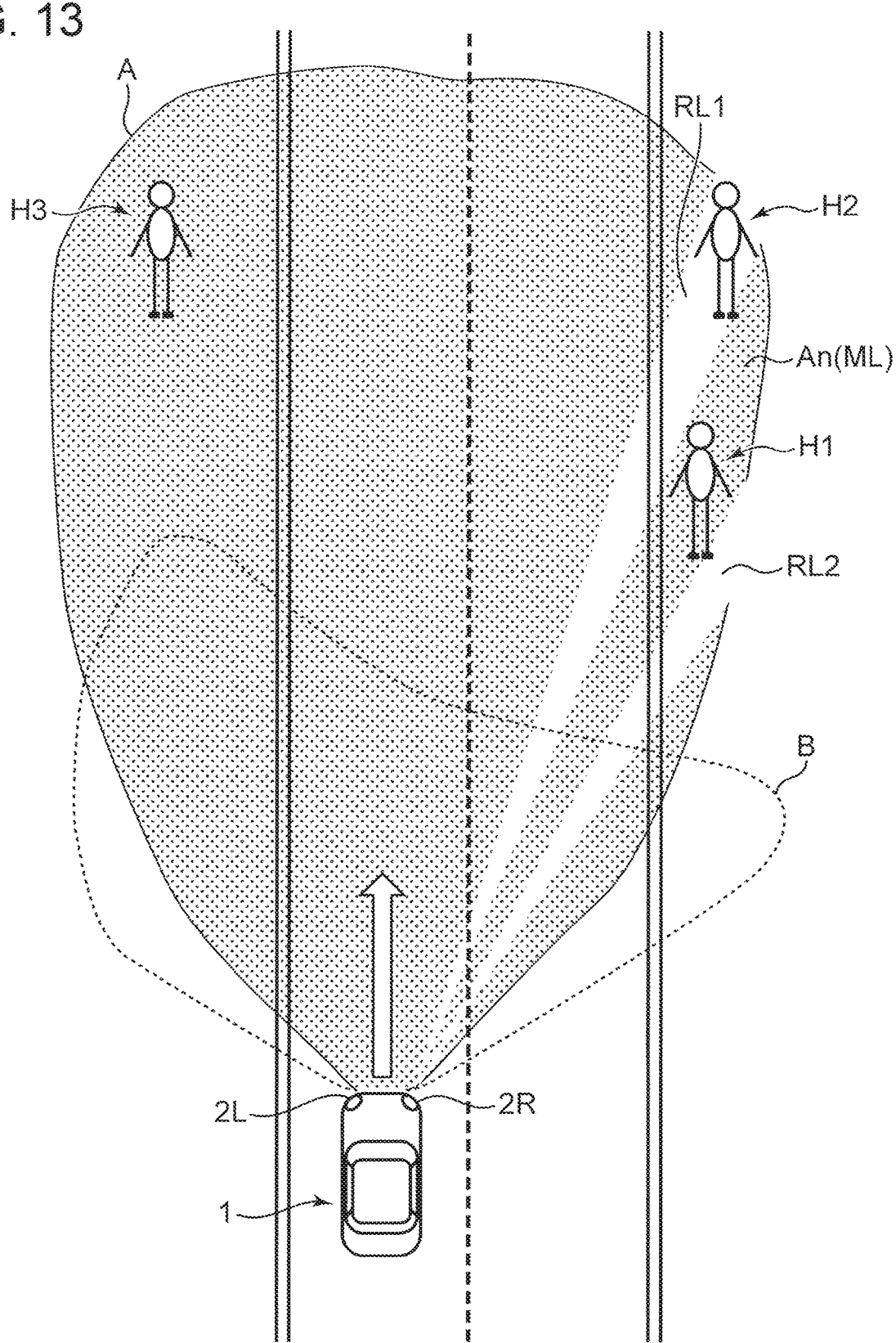
FIG. 13 is a view showing pedestrian marking according to the third embodiment.
Figure 14:
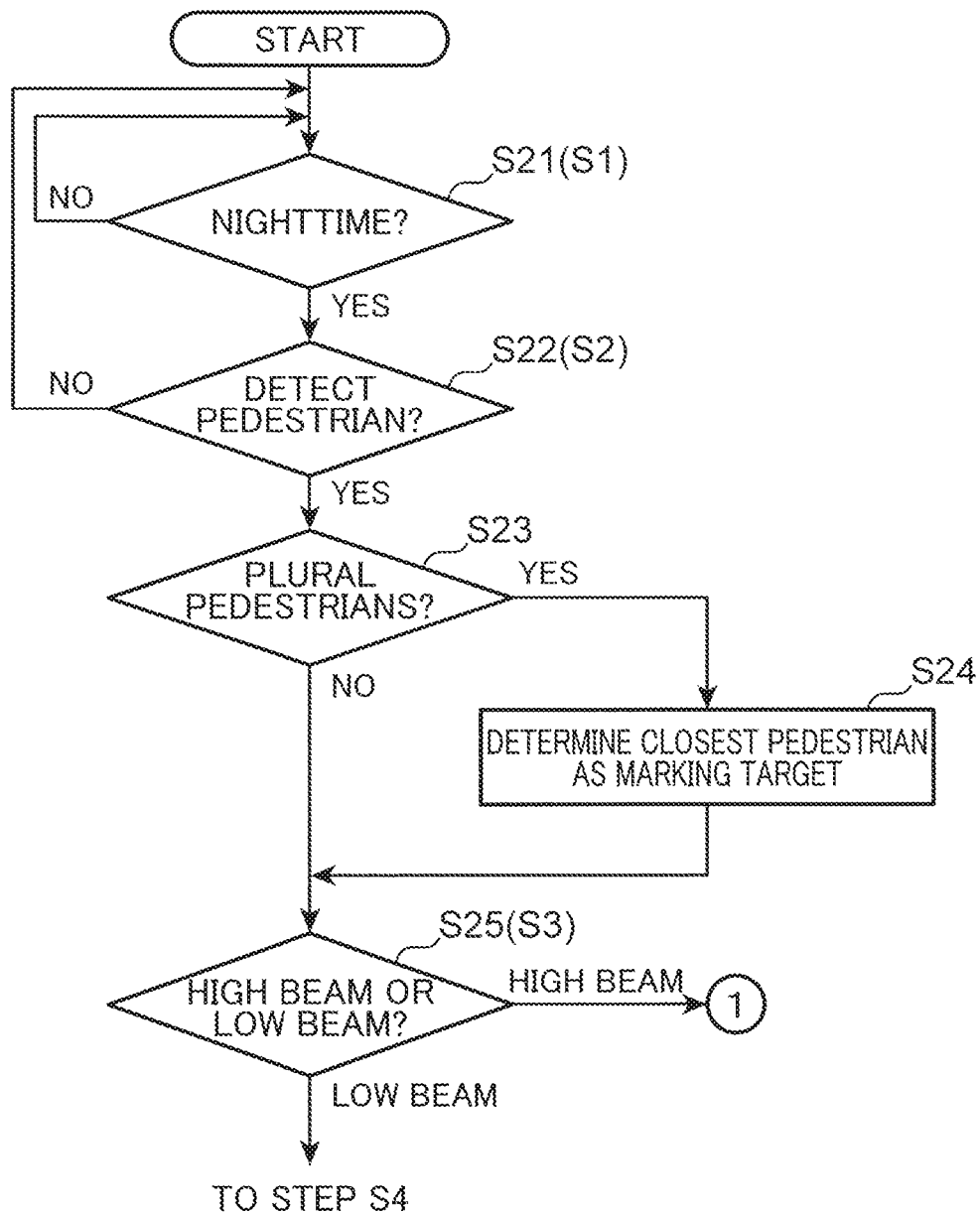
FIG. 14 is a flowchart showing pedestrian marking operation according to the third embodiment.

FIG. 13 is a view showing the pedestrian marking according to the third embodiment, and FIG. 14 is a part of a flowchart showing pedestrian marking operation according to the third embodiment. Similarly to steps S1, S2 in FIG. 10A, the ECU 5A judges whether or not it is nighttime traveling (step S21). If it is nighttime, the ECU 5A judges whether or not the pedestrian detection unit 51 detects the pedestrian H (step S22).

Then, if the pedestrian H is detected, it is determined whether or not a plurality of pedestrians H is detected (step S23). If the plurality of pedestrians H is detected (YES in step S23), it is determined that the pedestrian H closest to the vehicle 1 is to be marked (step S24). Subsequently, the determination unit 53 determines whether an irradiation state of the headlight units 2L, 2R is a high beam or a low beam (step S25). When the irradiation state is "high beam", a process proceeds to step S9 in FIG. 10B, and the marking light control unit 54 executes "second control" similar to the first embodiment.

FIG. 13 shows an example in which the pedestrian detection unit 51 detects three pedestrians H1, H2, and H3. In this case, the evaluation unit 55 refers to angle information of the pedestrians H1 to H3, reflection time of a radar reflected wave, and the like derived by the pedestrian detection unit 51, and gives an evaluation value that expresses proximity of each of the pedestrians H1 to H3 to the vehicle. In the example of FIG. 13, since the pedestrian H1 is closest to the vehicle 1, the evaluation unit 55 gives the highest evaluation value to the pedestrian H1, and in response to this, the marking light control unit 54 performs pedestrian marking based on the second control on the pedestrian H1. As a result, dimming regions RL1, RL2 are formed around the pedestrian H1, and the pedestrian H1 is irradiated with the LED element 23A having a position where the pedestrian H1 exists as an irradiation range An (marking dimming).

When the plurality of pedestrians H1 to H3 is detected in front of the vehicle, if all the pedestrians H1 to H3 are targets of the second control, a proportion of a dimmed region in an entire irradiation range of the high beam becomes high, and there is concern that visibility in front of the vehicle deteriorates. On the other hand, the pedestrian H1 closest to the vehicle 1 is a pedestrian to whom the driver of the vehicle 1 should pay most attention in general. According to the third embodiment, it is possible to mark such a pedestrian H1 and to prevent deterioration of the visibility in front of the vehicle.

Note that, if it is determined in step S25 that the irradiation state is "low beam", the process proceeds to step S4 in FIG. 10A, and the marking light control unit 54 performs "first control" similar to the first embodiment. Since there is no problem of degradation of visibility during low beam traveling, the pedestrians H1 to H3 may be irradiated with marking light ML. Of course, only the pedestrian H1 closest to the vehicle may be irradiated with the marking light ML.

Fourth Embodiment

As in the third embodiment, a fourth embodiment is also an embodiment related to pedestrian marking in a case where a plurality of pedestrians H is present in front of a vehicle, and a control configuration of a headlight unit according to the fourth embodiment is the same as the that of the third embodiment. However, in the fourth embodiment, an evaluation unit 55 does not simply derive an evaluation value from proximity of the pedestrian H to a vehicle 1 but derives an evaluation value regarding a substantial risk to the vehicle 1. The fourth embodiment is different from the third embodiment in that the pedestrian to be marked is determined based on this evaluation value.

When the plurality of pedestrians H is detected during high beam traveling, in order to determine the pedestrian H to whom pedestrian marking is executed, the evaluation unit 55 derives an evaluation value for each of the detected plurality of pedestrians H. In this fourth embodiment, an evaluation value concerning a possibility that each pedestrian H enters a traveling line of the vehicle 1 is derived. Then, a marking light control unit 54 executes the pedestrian marking exemplified in the above-described first embodiment with respect to the pedestrian H to whom the evaluation unit 55 gives an evaluation value with the highest possibility of entry.

Figure 15:
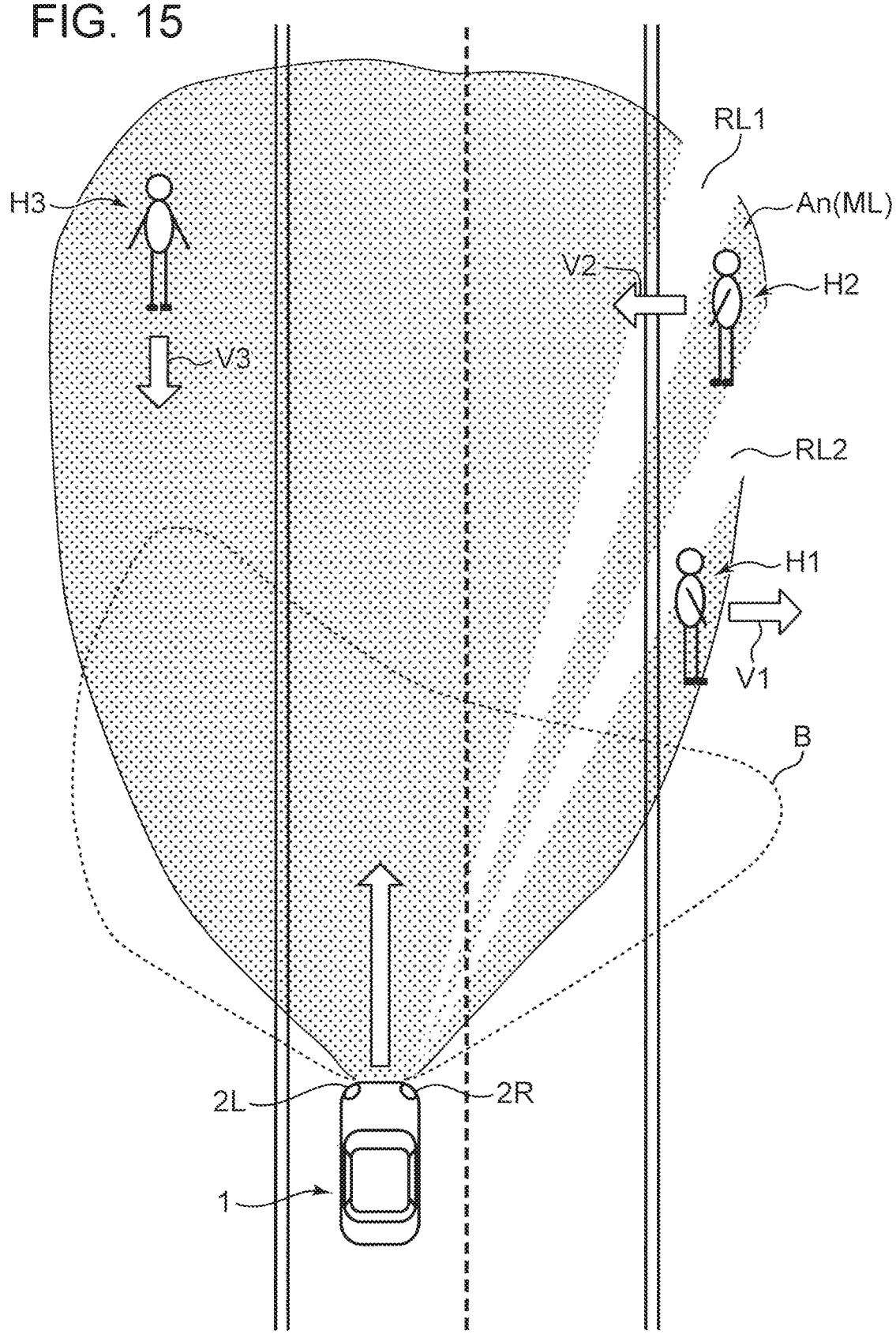
FIG. 15 is a view showing pedestrian marking according to a fourth embodiment.

FIG. 15 is a view showing the pedestrian marking according to the fourth embodiment, and FIG. 16 is a part of a flowchart showing pedestrian marking operation according to the fourth embodiment. FIG. 15 shows an example in which a pedestrian detection unit 51 detects three pedestrians H1, H2, and H3. Furthermore, vectors V1, V2, and V3 indicating moving directions of the pedestrians are drawn. Here, the pedestrian H1 has a vector V1 in a direction away from a roadway, the pedestrian H2 has a vector V2 in a direction approaching the roadway (traveling line), and the pedestrian H3 has a vector V3 in a direction parallel to the roadway and approaching the vehicle 1. Such vectors V1 to V3 can be extracted from plural pieces of position information of the pedestrians H1 to H3 acquired at different times.

The evaluation value regarding the possibility of the pedestrian H entering the traveling line of the vehicle 1 is derived based on the movement vectors V1 to V3 of the pedestrians H1 to H3 as described above. Each of the vectors V1 to V3 is obtained from speed in a longitudinal direction (direction parallel to the traveling line), speed in a lateral direction (direction perpendicular to the traveling line), and a longitudinal distance and a lateral distance from the vehicle 1 of each of the pedestrians H1 to H3. A pedestrian having a high possibility of entering the traveling line, that is, a pedestrian having the highest risk for the vehicle 1, has a vector toward the traveling line and has a short lateral distance. The evaluation unit 55 gives a high evaluation value to the pedestrian H having such a tendency.

In the example of FIG. 15, the highest evaluation value is given to the pedestrian H2. In other words, in a simple perspective to the vehicle 1, the pedestrian H1 is the closest. However, the vector V1 of the pedestrian H1 is oriented in a direction away from the roadway, and the possibility of entering the traveling line is low. Regarding the pedestrian H3, the lateral distance is short, but the longitudinal distance is long. The vector V3 is not oriented in a direction approaching the traveling line. On the other hand, the pedestrian H2 has the vector V2 oriented in the direction approaching the traveling line. Therefore, the evaluation unit 55 gives the highest evaluation value to the pedestrian H2, and in response thereto, the marking light control unit 54 performs pedestrian marking based on the second control on the pedestrian H2. As a result, dimming regions RL1, RL2 are formed around the pedestrian H2, and the pedestrian H2 is irradiated with the LED element 23A having a position where the pedestrian H2 exists as an irradiation range An (marking dimming).

Referring to FIG. 16, an ECU 5A determines whether or not it is nighttime traveling (step S31) as in steps S1 and S2 in FIG. 10A, and if it is nighttime, the ECU 5A determines whether the pedestrian detection unit 51 detects the pedestrian H (step S32). If the pedestrian H is detected, it is determined whether or not a plurality of pedestrians H is detected (step S33). When the plurality of pedestrians H is detected (YES in step S23), as described above, the evaluation unit 55 calculates a movement vector, a lateral distance, and the like of each pedestrian H1 to H3 to derive an evaluation value (step S34). Then, it is determined that the pedestrian H having the highest evaluation value is a pedestrian having the highest risk and that the pedestrian H is to be marked (step S35).

Subsequently, a determination unit 53 determines whether an irradiation state of the headlight units 2L, 2R is a high beam or a low beam (step S36). When the irradiation state is "high beam", a process proceeds to step S9 in FIG. 10B, and the marking light control unit 54 executes "second control" similar to the first embodiment. In the example of FIG. 15, the marking light control unit 54 performs the pedestrian marking based on the second control on the pedestrian H2. If it is determined in step S36 that the irradiation state is "low beam", the process proceeds to step S4 in FIG. 10A, and the marking light control unit 54 executes "first control" similar to the first embodiment on the pedestrians H1 to H3 or the pedestrian H2. According to the fourth embodiment as described above, when the plurality of pedestrians H is detected, it is possible to mark the pedestrian having the highest possibility of entering the traveling line and to prevent deterioration of visibility in front of the vehicle.

Fifth Embodiment

A fifth embodiment exemplifies pedestrian marking when a light source dedicated to marking light is used. FIG. 17A is a schematic view showing a headlight unit 2A used in the fifth embodiment. The headlight unit 2A includes a marking light unit 26 in addition to the low beam unit 21 and the high beam unit 22 described above. In other words, the headlight unit 2A does not form marking light using a high beam, but has a light source dedicated to the marking light. The marking light unit 26 has an LED array 27.

FIG. 17B is a schematic view of the LED array 27. A configuration of the LED array 27 is similar to that of the LED array 23 shown in FIG. 2B, and the LED array 27 includes a plurality of LED elements 27A having different irradiation ranges (angles) as unit light sources. In sections with package numbers 1 to 11 disposed in a row in a lateral direction, LED elements 27A which can independently control a light amount are contained as the unit light sources.

FIG. 18 is a block diagram showing a control configuration of the headlight unit according to the fifth embodiment. Differences from the first embodiment (FIG. 4) are that an ECU 5B does not include a determination unit 53, and that headlight units 2L, 2R each include the marking light unit 26 described above.

In the fifth embodiment, a marking light control unit 54 irradiates a pedestrian H with marking light ML by controlling an irradiation state of the marking light unit 26. In addition, the marking light control unit 54 executes pedestrian marking by the marking light unit 26 regardless of high beam traveling or low beam traveling. Further, the marking light control unit 54 controls an irradiation state of a high beam or a low beam, and gives a control signal to a headlight lighting circuit 24 so that a dimming region is formed around the pedestrian H. Therefore, in the present embodiment, one having a light source having the same configuration as the LED array 23 shown in FIG. 2A is used as the low beam unit 21.

Figure 19:
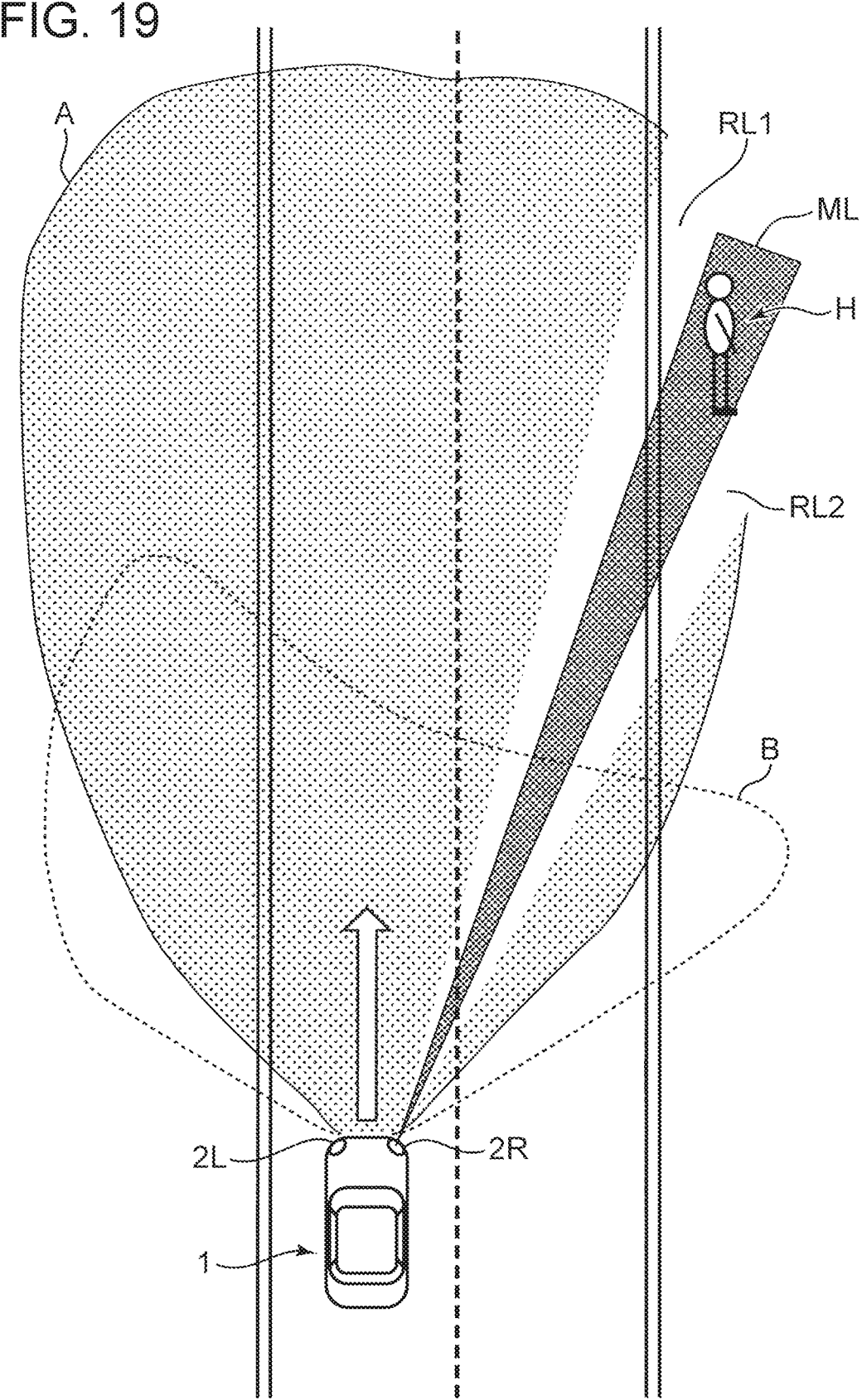
FIG. 19 is a view showing pedestrian marking according to the fifth embodiment.

FIG. 19 is a view showing pedestrian marking according to the fifth embodiment. FIG. 19 shows a state in which the pedestrian H detected by the pedestrian detection unit 51 is irradiated with the marking light ML emitted from the marking light unit 26 during the high beam traveling. In other words, the marking light control unit 54 turns on a specific LED element 27A of the LED array 27 included in the marking light unit 26 based on position information of the pedestrian H to irradiate the pedestrian H with the marking light ML.

Also, as in the above-described embodiments, dimming regions RL1, RL2 are formed around the pedestrian H. The dimming regions RL1, RL2 are formed by dimming a part of LED elements 23A of the LED array 23 included in the high beam unit 22. It should be noted that the LED element 23A sandwiched between the dimmed LED elements 23A and having an irradiation range in the vicinity of a position where the pedestrian H is present may be a target to be dimmed or not. In the latter case, since the pedestrian H is irradiated with the high beam emitted from the LED element 23A of the high beam unit 22 in addition to the marking light ML, the pedestrian H can have higher luminance.

Though not shown, the same control is executed also during the low beam traveling. In other words, the marking light control unit 54 emits the marking light ML from the marking light unit 26 based on the position information of the pedestrian H, and dims a part of the LED array included in the low beam unit 21, whereby the dimming regions RL1, RL2 are formed around the pedestrian H.

Figure 20:
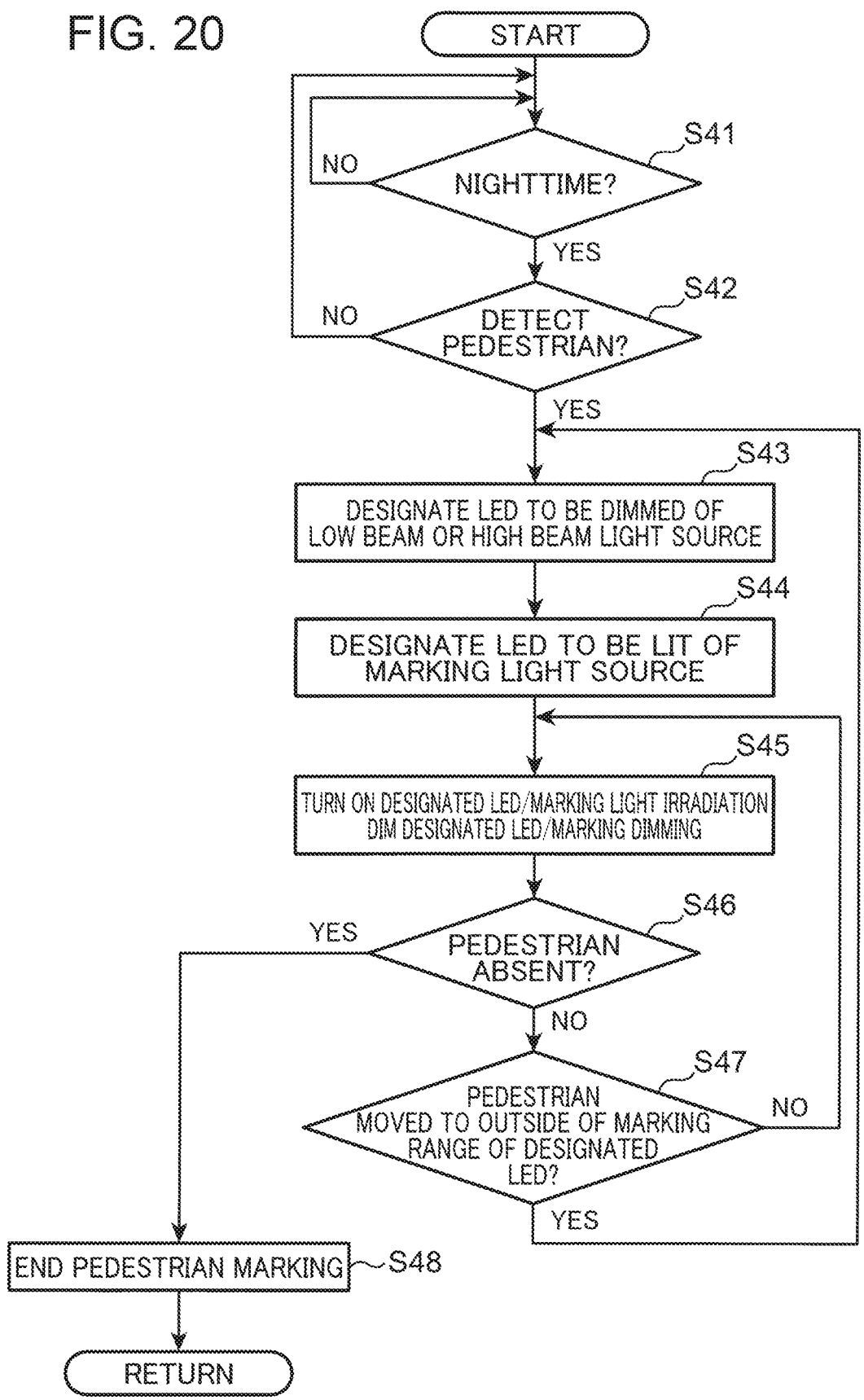
FIG. 20 is a flowchart showing pedestrian marking operation according to the fifth embodiment.

FIG. 20 is a flowchart showing pedestrian marking operation according to the fifth embodiment. Similarly to steps S1 and S2 in FIG. 10A, the ECU 5B determines whether or not it is nighttime traveling (step S41). If it is nighttime, the ECU 5B determines whether or not the pedestrian detection unit 51 detects the pedestrian H (step S42). If the pedestrian H is detected (YES in step S42), the marking light control unit 54 dims a part of the low beam or the high beam for marking dimming based on position information of the pedestrian H derived by the pedestrian detection unit 51.

Specifically, in a case of the low beam traveling, among the plurality of LED elements included in the low beam unit 21 in a full lighting state, the marking light control unit 54 designates an LED element having an irradiation range around the pedestrian H as a dimming target. Similarly, in a case of the high beam traveling, an LED element 23A to be dimmed is designated among the plurality of LED elements 23A included in the high beam unit 22 (step S43).

Further, based on the position information of the pedestrian H, the marking light control unit 54 designates an LED element 27A to be lit among the plurality of LED elements 27A included in the LED array 27 of the marking light unit 26 (step S44). In other words, the LED element 27A that emits the marking light ML is designated. Then, the marking light control unit 54 outputs a control signal to the headlight lighting circuit 24 to dim the LED element 23A designated in step S43 and to light the LED element 27A designated in step S44 (step S45). Thus, as exemplified in FIG. 19, it is possible to irradiate the pedestrian H with the marking light ML and form the dimming regions RL1, RL2 around the pedestrian H.

Subsequently, based on a detection result of the pedestrian detection unit 51, it is confirmed whether the pedestrian H has deviated from a range to be marked (pedestrian absence) (step S46). If it is determined that the pedestrian is absent (YES in step S46), the ECU 5B ends the pedestrian marking (step S48).

If the pedestrian detection unit 51 continues to detect presence of the pedestrian H within a range where the pedestrian marking is required (NO in step S46), the marking light control unit 54 determines whether the pedestrian H has relatively moved to outside of a marking range (irradiation range) of the LED element 27A designated in step S44 (step S47). If the pedestrian H has not yet deviated from the irradiation range (NO in step S47), the same LED element 27A is lit and the LED element 23A is dimmed continuously, and a process returns to step S45 to continue processing. On the other hand, if the pedestrian H has moved to a position deviated from the irradiation range of the designated LED element 27A (YES in step S47), the marking light control unit 54 newly designates an LED element 23A to be dimmed and an LED element 27A to be lit according to position information of the pedestrian H at that time (return to step S43).

Sixth Embodiment

In a sixth embodiment, rather than positively irradiating a pedestrian H with marking light, a mode in which a periphery of the pedestrian H is simply dimmed (marking dimming) when the pedestrian H is detected is exemplified. In a control configuration of a headlight unit according to the sixth embodiment, for example, a determination unit 53 and a marking light control unit 54 are omitted from the ECU 5 of the first embodiment (FIG. 4), and a headlight control unit 52 can execute control of the marking dimming.

Figure 21:
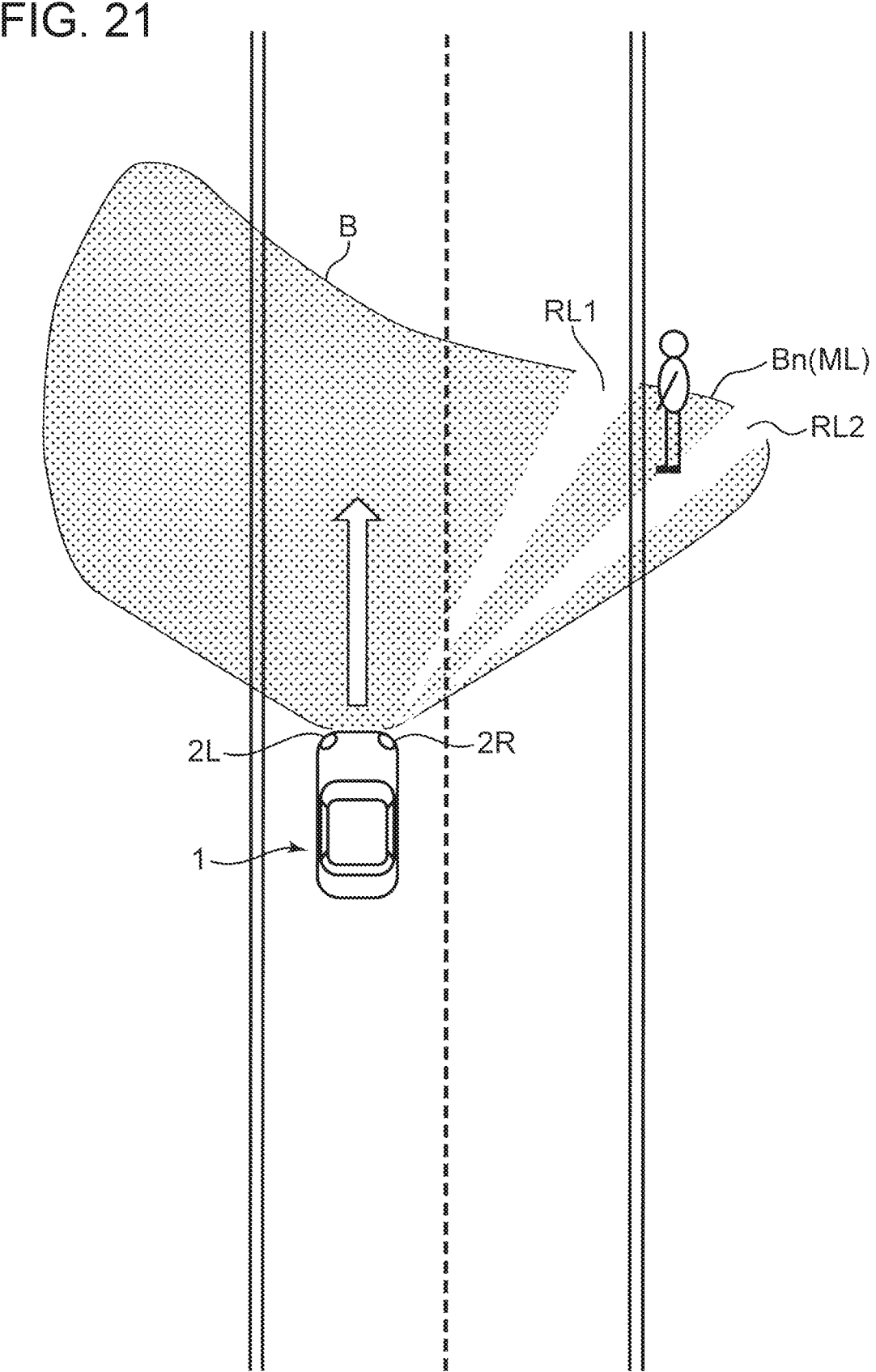
FIG. 21 is a view showing pedestrian marking according to a sixth embodiment.

FIG. 21 is a view showing pedestrian marking according to the sixth embodiment. FIG. 21 shows a state in which dimming regions RL1, RL2 are formed around the pedestrian H detected by a pedestrian detection unit 51 during low beam traveling. A beam corresponding to marking light ML is made by a part of the low beam. In other words, the pedestrian H is irradiated with a beam emitted from an LED element of a low beam unit 21 having an irradiation range Bn between the pair of dimming regions RL1, RL2. In other words, the headlight control unit 52 turns on a specific LED element of an LED array included in the low beam unit 21, and dims a pair of LED elements adjacent to the specific LED element, thereby forming an irradiation state of the low beam which can stand out the pedestrian H. At the time of high beam traveling, the headlight control unit 52 controls an irradiation state of a high beam unit 22 to perform marking dimming similar to the above.

FIG. 22 is a flowchart showing pedestrian marking operation according to the sixth embodiment. An ECU determines whether or not it is nighttime traveling (step S51). If it is nighttime traveling, the ECU determines whether or not the pedestrian detection unit 51 detects the pedestrian H (step S52). If the pedestrian H is detected (YES in step S52), the headlight control unit 52 dims a part of the low beam or the high beam for marking dimming based on position information of the pedestrian H derived by the pedestrian detection unit 51.

Specifically, in a case of the low beam traveling, among a plurality of LED elements included in the low beam unit 21 in a full lighting state, the headlight control unit 52 designates an LED element having an irradiation range around the pedestrian H as a dimming target. Similarly, in a case of the high beam traveling, an LED element 23A to be dimmed is designated among a plurality of LED elements 23A included in the high beam unit 22 (step S53). Then, the LED element designated in step S53 is dimmed (step S54). As a result, as illustrated in FIG. 21, the dimming regions RL1, RL2 are formed around the pedestrian H, so that contrast in brightness between the pedestrian H and his/her surroundings can be enhanced.

Subsequently, based on a detection result of the pedestrian detection unit 51, it is confirmed whether the pedestrian H has deviated from a range to be marked (pedestrian absence) (step S55). If it is determined that the pedestrian is absent (YES in step S55), the ECU ends the pedestrian marking (step S57).

If the pedestrian detection unit 51 continues to detect presence of the pedestrian H within a range where the pedestrian marking is required (NO in step S55), the headlight control unit 52 determines whether the pedestrian H has relatively moved to outside of a range between the marking dimming regions of the LED element 27A designated in step S53 (step S56). If the pedestrian H has not yet deviated from the range between the dimming regions (NO in step S56), the dimming of the same LED element is continued, and a process returns to step S54 to continue processing. On the other hand, if the pedestrian H has moved to a position deviated from the range between the dimming regions of the designated LED element (YES in step S56), the headlight control unit 52 newly designates an LED element to be dimmed in accordance with position information of the pedestrian H at that time (return to step S53).

According to the vehicle headlight control devices of the present invention described above, when the pedestrian H exists within the irradiation range of the headlight, dimming control for dimming the periphery of the pedestrian H is executed. By the dimming, contrast in brightness between the pedestrian H and his/her surroundings is enhanced. Therefore, even if the pedestrian H already exists in the region illuminated with the headlight (low beam or high beam), the pedestrian H can be made to stand out. As a result, good pedestrian marking can be achieved. Therefore, it is possible to enhance pedestrian visibility of a driver during nighttime traveling.

Finally, characteristic configurations disclosed in the above embodiments and effects based thereon will be described collectively.

A vehicle headlight control device according to one aspect of the present invention includes a pedestrian detection unit that detects a pedestrian in front of a vehicle and a headlight control unit that controls an irradiation state of the headlight. When the pedestrian detection unit detects a pedestrian within an irradiation range of the headlight, the headlight control unit executes dimming control for controlling the irradiation state of the headlight so that a periphery of the pedestrian is dimmed.

According to this vehicle headlight control device, when the pedestrian is present within the irradiation range of the headlight, dimming control for dimming the periphery of the pedestrian is executed. By the dimming, contrast in brightness between the pedestrian and his/her surroundings is enhanced. Note that, in the present invention, "dimming" is a concept including lighting off. Therefore, even when a pedestrian already exists in a region illuminated with a headlight, the pedestrian can be made to stand out. As a result, good pedestrian marking can be achieved.

In the vehicle headlight control device, it is desirable that, in the dimming control, the headlight control unit dims at least a side, of both sides of the pedestrian, closer to an axis in a vehicle traveling direction.

Normally, the pedestrian is detected not on a traveling line but in any one of left and right regions of the traveling line. In general, as an orientation distribution of the headlight spreads to left and right from the traveling line, luminance tends to decrease. In other words, of both sides of the pedestrian, the side closer to the traveling line has higher luminance. Therefore, contrast between the pedestrian and his/her surroundings can be further enhanced by dimming the closer side. For example, the above configuration can be preferably applied to a case where it is not possible to select an irradiation range of a headlight with high resolution and it is difficult to dim both sides of a pedestrian.

In the vehicle headlight control device, when the pedestrian detection unit detects a plurality of pedestrians, it is desirable that the headlight control unit executes the dimming control on a pedestrian closest to the vehicle.

When the plurality of pedestrians is detected in front of the vehicle, if all the pedestrians are targets of the dimming control, a proportion of a dimmed region in an entire irradiation region of the headlight becomes high, and there is concern that visibility in front of the vehicle may be deteriorated. On the other hand, the pedestrian closest to the vehicle is a pedestrian to whom a driver of the vehicle should generally pay most attention. According to the above configuration, it is possible to mark such a pedestrian and to prevent deterioration of visibility in front of the vehicle.

It is desirable that the vehicle headlight control device described above further includes an evaluation unit that derives, when the pedestrian detection unit detects a plurality of pedestrians, an evaluation value concerning a possibility that each pedestrian may enter a traveling line of the vehicle and that the headlight control unit executes the dimming control on a pedestrian to whom the evaluation unit gives an evaluation value with the highest possibility of entry.

A pedestrian actually having the highest risk to the vehicle is a pedestrian having the highest possibility of entering the traveling line. According to the above configuration, it is possible to mark such a pedestrian and to prevent deterioration of visibility in front of the vehicle.

In the above vehicle headlight control device, when the headlight includes a light source dedicated to marking light for irradiating a pedestrian in addition to a low beam light source and a high beam light source, it is desirable that, the headlight control unit controls irradiation of the pedestrian with marking light emitted from the light source dedicated to the marking light when executing the dimming control.

According to this vehicle headlight control device, the dimming control is executed, and the pedestrian is irradiated with the marking light. In other words, while an irradiation state in a low beam or a high beam is controlled so that the periphery of the pedestrian is dimmed, the pedestrian is irradiated with the marking light in a spotlight manner. As a result, contrast in brightness between the pedestrian and his/her surroundings is enhanced, and the pedestrian can be made to stand out.

In the vehicle headlight control device, it is desirable that the dimming control is executed by controlling an irradiation state of the low beam light source or the high beam light source so that the periphery of the pedestrian is dimmed.

According to this vehicle headlight control device, the pedestrian can be made to stand out by dimming of the low beam or the high beam. In addition, since the pedestrian can be irradiated by superimposing the marking light from the dedicated light source and the low beam or the high beam, it is possible to further enhance luminance of the pedestrian.

According to the present invention described above, it is possible to provide a vehicle headlight control device capable of generating irradiation light that makes a pedestrian stand out, even when the pedestrian exists in an irradiation region of the headlight.

The invention claimed is:

1. A vehicle headlight control device comprising:
   a pedestrian detection unit that detects a pedestrian in front of a vehicle; and
   a headlight control unit that controls an irradiation state of a headlight, the headlight having an orientation distribution that tends to decrease in luminance as the distribution spreads to left and right from an axis in a vehicle traveling direction, wherein
   when the pedestrian detection unit detects a pedestrian within an irradiation range of the headlight, the headlight control unit executes dimming control for controlling the irradiation state of the headlight so that a periphery of the pedestrian is dimmed, and
   the dimming control is a control that dims a side, of both sides of the pedestrian, closer to the axis in the vehicle traveling direction and that does not dim the pedestrian and a side farther from the axis.

2. The vehicle headlight control device according to claim 1, wherein when the pedestrian detection unit detects a plurality of pedestrians, the headlight control unit executes the dimming control on a pedestrian closest to the vehicle.

3. The vehicle headlight control device according to claim 2, wherein
   when the headlight includes a light source dedicated to marking light for irradiating a pedestrian, in addition to a low beam light source and a high beam light source, the headlight control unit controls irradiation of the pedestrian with marking light emitted from the light source dedicated to the marking light when executing the dimming control.

4. The vehicle headlight control device according to claim 1, further comprising: an evaluation unit that derives, when the pedestrian detection unit detects a plurality of pedestrians, an evaluation value concerning a possibility that each pedestrian enters a traveling line of the vehicle, wherein
   the headlight control unit executes the dimming control on a pedestrian to whom the evaluation unit gives an evaluation value with a highest possibility of entry.

5. The vehicle headlight control device according to claim 1, wherein
   when the headlight includes a light source dedicated to marking light for irradiating a pedestrian, in addition to a low beam light source and a high beam light source, the headlight control unit controls irradiation of the pedestrian with marking light emitted from the light source dedicated to the marking light when executing the dimming control.

6. The vehicle headlight control device according to claim 5, wherein the headlight control unit executes the dimming control by controlling an irradiation state of the low beam light source or the high beam light source so that the periphery of the pedestrian is dimmed.

7. The vehicle headlight control device according to claim 3, wherein the headlight control unit executes the dimming control by controlling an irradiation state of the low beam light source or the high beam light source so that the periphery of the pedestrian is dimmed.

8. The vehicle headlight control device according to claim 4, wherein
   when the headlight includes a light source dedicated to marking light for irradiating a pedestrian, in addition to a low beam light source and a high beam light source, the headlight control unit controls irradiation of the pedestrian with marking light emitted from the light source dedicated to the marking light when executing the dimming control.

9. The vehicle headlight control device according to claim 8, wherein the headlight control unit executes the dimming control by controlling an irradiation state of the low beam light source or the high beam light source so that the periphery of the pedestrian is dimmed.

* * * * *